ELECTRONIC APPARATUS FOR CLASSROOM INSTRUCTION

Filed Sept. 12, 1960

Inventors:
Merlin J. Applegate,
William R. Dufendach,
by Gust & Irish.
Attorneys.

Inventors:
Merlin J. Applegate,
William R. Dufendach,
by Lust & Irish
Attorneys.

Sept. 8, 1964 W. R. DUFENDACH ETAL 3,147,555

ELECTRONIC APPARATUS FOR CLASSROOM INSTRUCTION

Filed Sept. 12, 1960

14 Sheets-Sheet 3

Inventors:
Merlin J. Applegate,
William R. Dufendach,
by Just & Irish
Attorneys.

Sept. 8, 1964 W. R. DUFENDACH ETAL 3,147,555

ELECTRONIC APPARATUS FOR CLASSROOM INSTRUCTION

Filed Sept. 12, 1960

14 Sheets-Sheet 4

Inventors:
Merlin J. Applegate,
William R. Dufendach,
by Gust & Irish
Attorneys.

Inventors:
Merlin J. Applegate,
William R. Dufendach,
by Gust & Irish
Attorneys.

ELECTRONIC APPARATUS FOR CLASSROOM INSTRUCTION

Filed Sept. 12, 1960 14 Sheets-Sheet 6

Inventors:
Merlin J. Applegate,
William R. Dufendach,
by Lust & Irish
Attorneys.

Sept. 8, 1964 W. R. DUFENDACH ET AL 3,147,555

ELECTRONIC APPARATUS FOR CLASSROOM INSTRUCTION

Filed Sept. 12, 1960 14 Sheets-Sheet 7

Inventors:
Merlin J. Applegate,
William R. Dufendach,
by Gust & Irish
Attorneys.

Inventors:
Merlin J. Appegate,
William R. Dufendach,
by Gust & Irish
Attorneys.

ELECTRONIC APPARATUS FOR CLASSROOM INSTRUCTION

Inventors:
Merlin J. Applegate,
William R. Dufendach,
by Lust & Orish
Attorneys.

ELECTRONIC APPARATUS FOR CLASSROOM INSTRUCTION

Filed Sept. 12, 1960

14 Sheets-Sheet 10

Inventors:
Merlin J. Applegate,
William R. Dufendach,
by Gust & Irish
Attorneys.

Inventors:
Merlin J. Applegate,
William R. Dufendach,
by Gust & Irish
Attorneys.

Sept. 8, 1964 W. R. DUFENDACH ETAL 3,147,555

ELECTRONIC APPARATUS FOR CLASSROOM INSTRUCTION

Filed Sept. 12, 1960 14 Sheets-Sheet 12

Inventors:
Merlin J. Applegate,
William R. Dufendach,
by Gust & Irish
Attorneys.

Inventors:
Merlin J. Applegate,
William R. Dufendach,
by Gust & Irish
Attorneys.

Inventors:
Merlin J. Applegate,
William R. Dufendach,
by Gust & Irish
Attorneys.

United States Patent Office 3,147,555

Patented Sept. 8, 1964

3,147,555

ELECTRONIC APPARATUS FOR CLASSROOM INSTRUCTION

William R. Dufendach and Merlin J. Applegate, both % Vari-Tech Co., 546 Leonard St. NW., Grand Rapids, Mich.

Filed Sept. 12, 1960, Ser. No. 60,111
21 Claims. (Cl. 35—8)

The present invention relates to electronic apparatus for classroom instruction and more particularly to apparatus used in the fields of teaching foreign languages, speech therapy, remedial reading, student tutoring, public speaking, voice training, and the like. The invention comprehends the supervision and teaching by a single instructor of a plurality of students simultaneously.

With respect to classroom instruction, electronic apparatuses and systems have heretofore been used for instructional purposes. Such prior apparatuses and systems have suffered from certain inherent defects and shortcomings in many different respects, such as in failing to provide a sufficient number of electronic facilities, of placing an extra burden on the instructor, of failing to provide adequate supervision and controls, and of unreliability in the operation of the equipment. Such apparatuses and devices have heretofore incorporated magnetic tape recorders and reproducers whereby the students may receive prerecorded lessons and make oral responses which are recorded and later monitored by either the instructor or student, or both. These apparatuses and devices have not been entirely satisfactory, again for many different reasons, but primarily because of lack of flexibility in transmitting a lesson to the student, recording the oral responses of the student, playing back the oral responses to the student or to the instructor, and performing these operations either conjointly or separately. It has been discovered that complete flexibility of operation is required in giving classroom instruction simultaneously to a plurality of students and further that in giving individualized instruction, the operation of the system must be relatively simple and immediately convenient for the instructor in order to maintain the efficacy of the overall system.

While the principles of the present invention may be employed in the fields of foreign language instruction, speech therapy, remedial reading, student tutoring, public speaking, voice training and the like, the following comments and description of the present invention will proceed with reference to the field of teaching languages. It has been learned that in teaching a language to a class of students, it is desirable for each student to have individualized instruction throughout the class period, such instruction being paced to maintain the level of learning of the respective students. This obviously means that since some students learn more rapidly than others, more advanced lessons must be given to these students while the slower students should be given the less advanced lessons.

In teaching languages, it is necessary for the student not only to hear the oral presentation but to speak it and then to monitor his spoken responses. Also, the student may speak in a translation of the language lesson and have this monitored by a recording device, by the instructor or by another student.

These requirements in an efficient and efficacious system are accomplished with complete flexibility in the present invention through the provision of a plurality of magnetic tape reproducers, combination magnetic tape reproducing and playback devices, an instructor's amplifying station, a plurality of student-receiving stations, and unique apparatuses for switching these components into and out of circuitry with each other whereby an almost indefinite number of possible circuit configurations may be achieved. Among these possible configurations are the ones whereby a master tape recorded lesson may be transmitted to a given number of students simultaneously, the students' oral responses recorded, the oral responses along with the master lesson played back to the students or to the instructor, the establishment of communication between selected students whereby the language may be spoken therebetween, communication between one or more students and the instructor, and many other possible circuit configurations too numerous to mention.

Contributing to the provision of these innumerable possible circuit configurations in the present invention is a unique switching device which makes use of printed circuits and avoids all use of rotary and the like switches. Through the use of this unique switching apparatus, a very large percentage of the soldered connections which would normally be used are eliminated. Also, the reliability and ruggedness of the system are improved, while at the same time the size of the overall assembly is reduced. There is also accomplished a more facile selection of a particular program or circuit connection and the identification of the selected circuit.

In view of the foregoing, it is an object of this invention to provide an electronic system capable of being used in a classroom to give individualized student instruction.

It is another object to provide an improved electronic system for classroom instruction which is reliable, efficient, economical and facile in operation.

It is yet another object to provide an electronic system for classroom instruction useful in the fields of speech therapy, remedial reading, student tutoring, public speaking, voice training, foreign language instruction and the like.

It is still another object of this invention to provide an electronic system for classroom instruction which includes an improved and unique switching assembly for establishing selectively a number of different electrical circuits to a plurality of student stations whereby the students may simultaneously receive different lessons, record their responses, receive instruction directly from an instructor, have the recorded responses played back, communicate with each other and the instructor and the like, all under the supervision and control of the instructor.

It is still another object to provide a matrix-switching assembly uniquely constructed to minimize the number of soldered connections, improve reliability of switching, reduce the size of the switching assembly over prior art devices, facilitate switching operations, and maintain costs of manufacture and operation thereof to a minimum.

It is another object to provide electronic communication circuitry whereby the level of audio output signals of a plurality of amplifiers interconnected in a communications system may be individually controlled without appreciably affecting the level of audio output signal in any other amplifier.

It is a further object to provide electronic circuits uniquely useful in a composite system for classroom instruction purposes.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein.

Figure 15A:
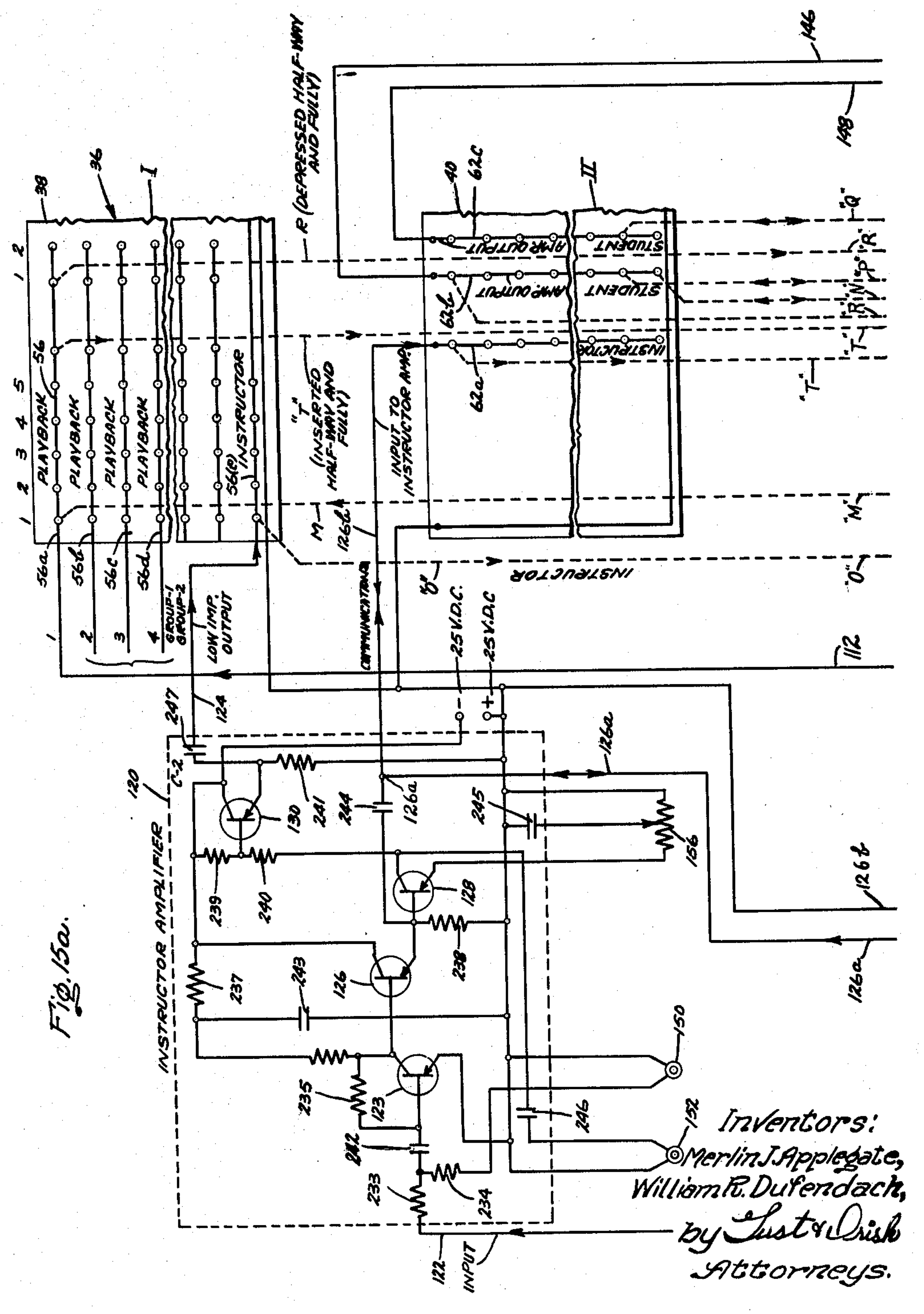
Figure 15B:
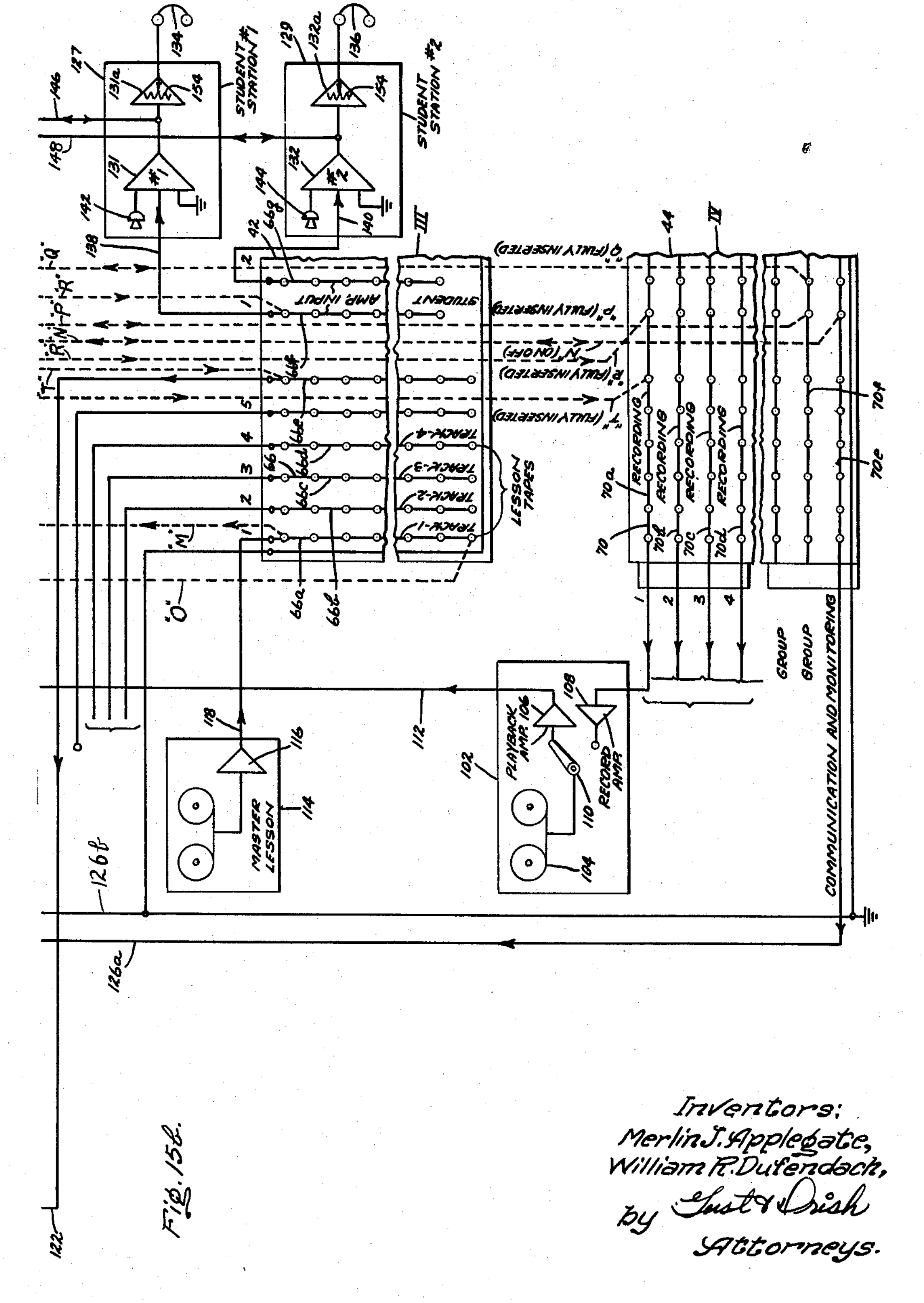
Figure 16A:
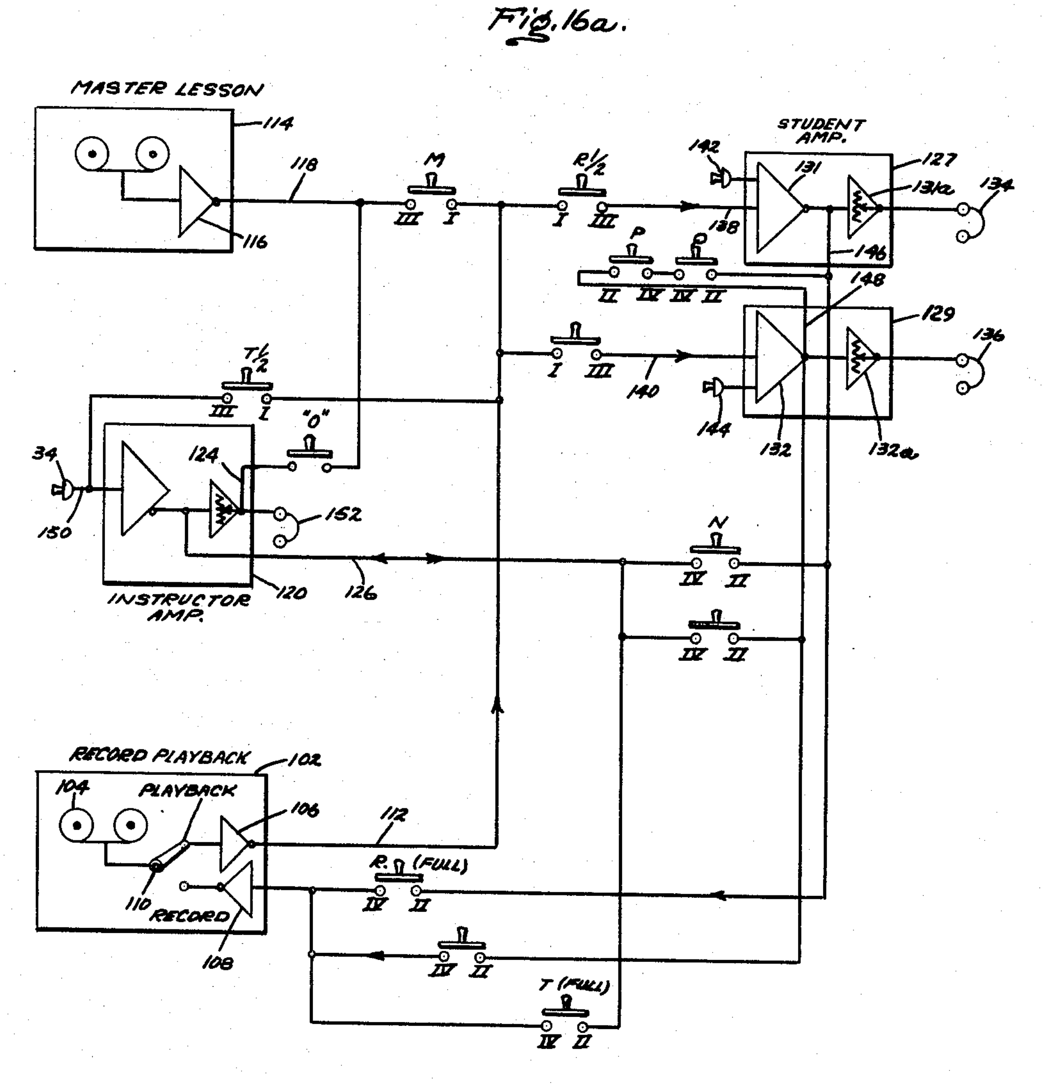
Figure 16B:
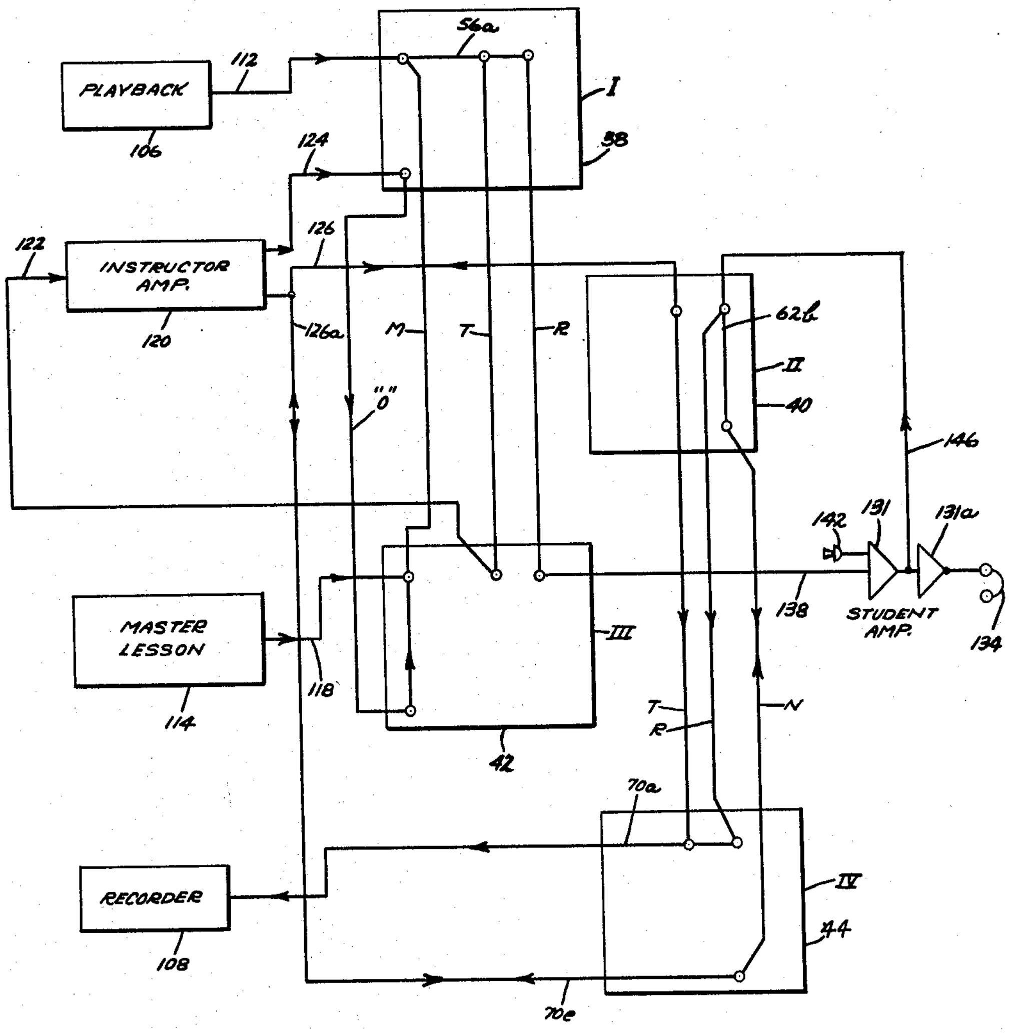
Figures 17, 18:
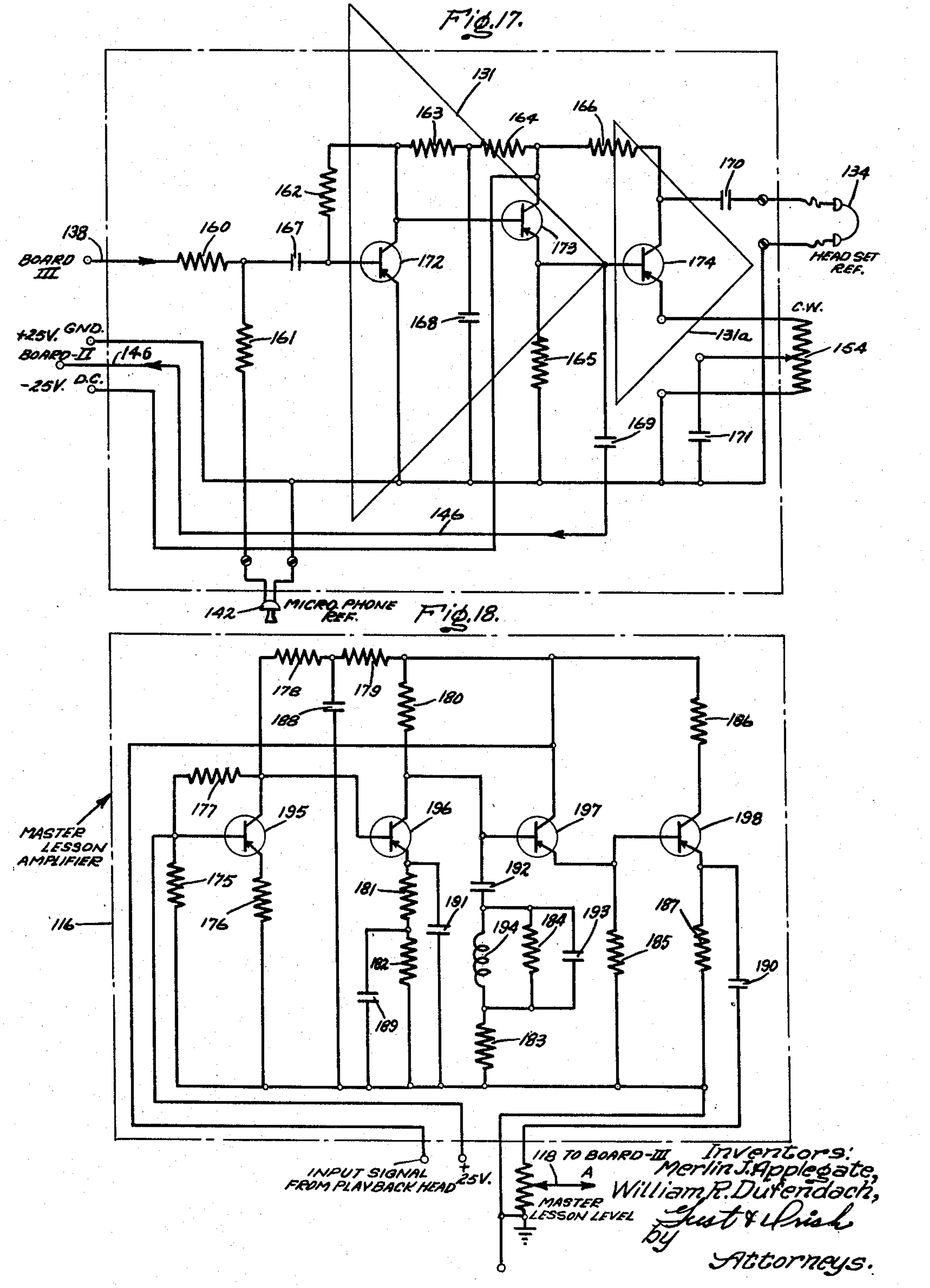
Figure 19:
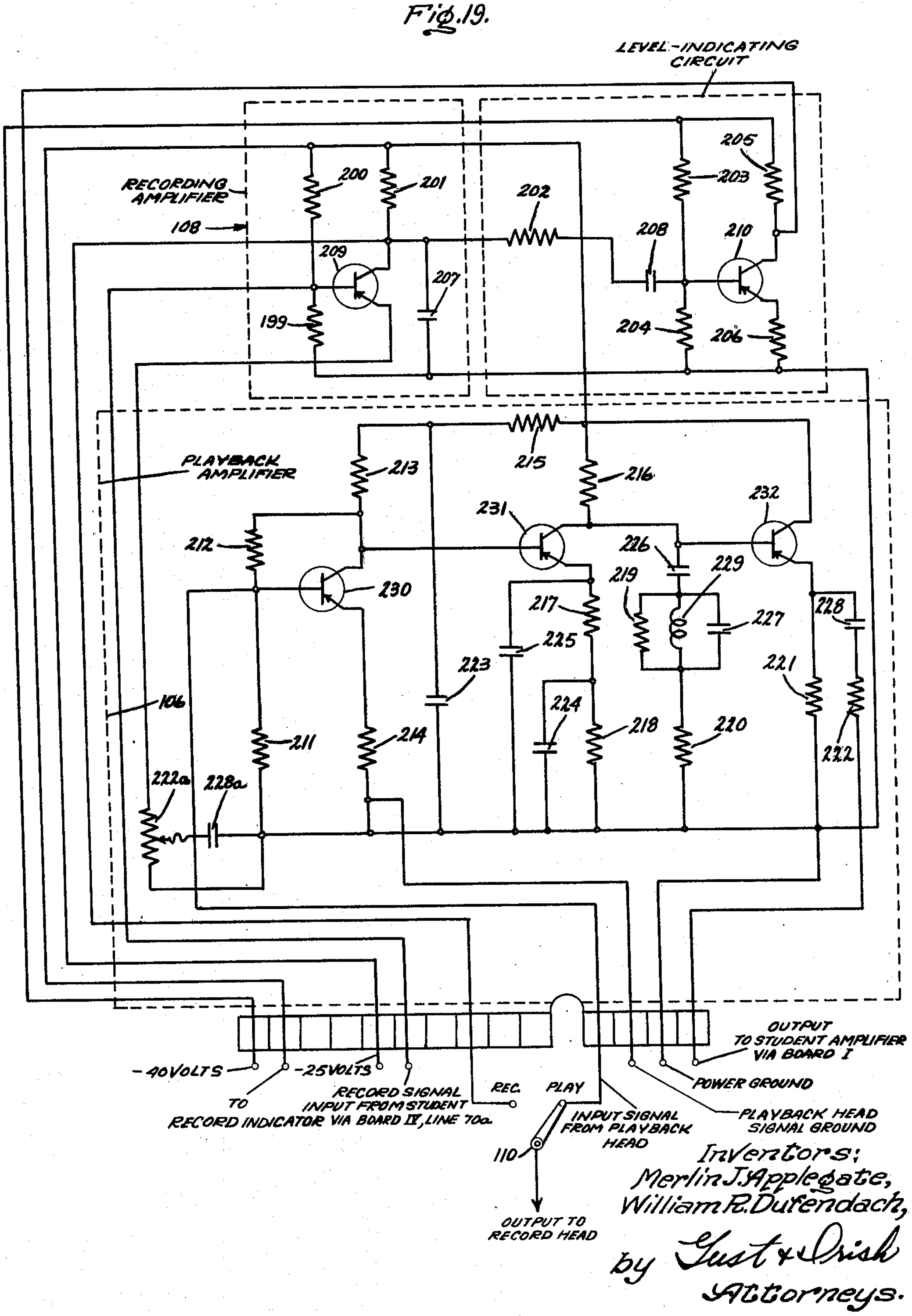

FIGS. 15*a* and 15*b* illustrate a simplified circuit diagram of the complete system of this invention;

FIG. 16*a* is a block diagram of the system of FIGS. 15*a* and 15*b* used in connection with describing the invention;

FIG. 16*b* is a further simplified block diagram of the circuit of FIGS. 15*a* and 15*b*;

FIG. 17 is a circuit diagram of a student station amplifier;

FIG. 18 is a circuit diagram of the amplifier used in conjunction with the master lesson tape deck; and FIG. 19 is a circuit diagram of the record and play back amplifiers used in conjunction with the record-playback tape decks.

Figure 2:
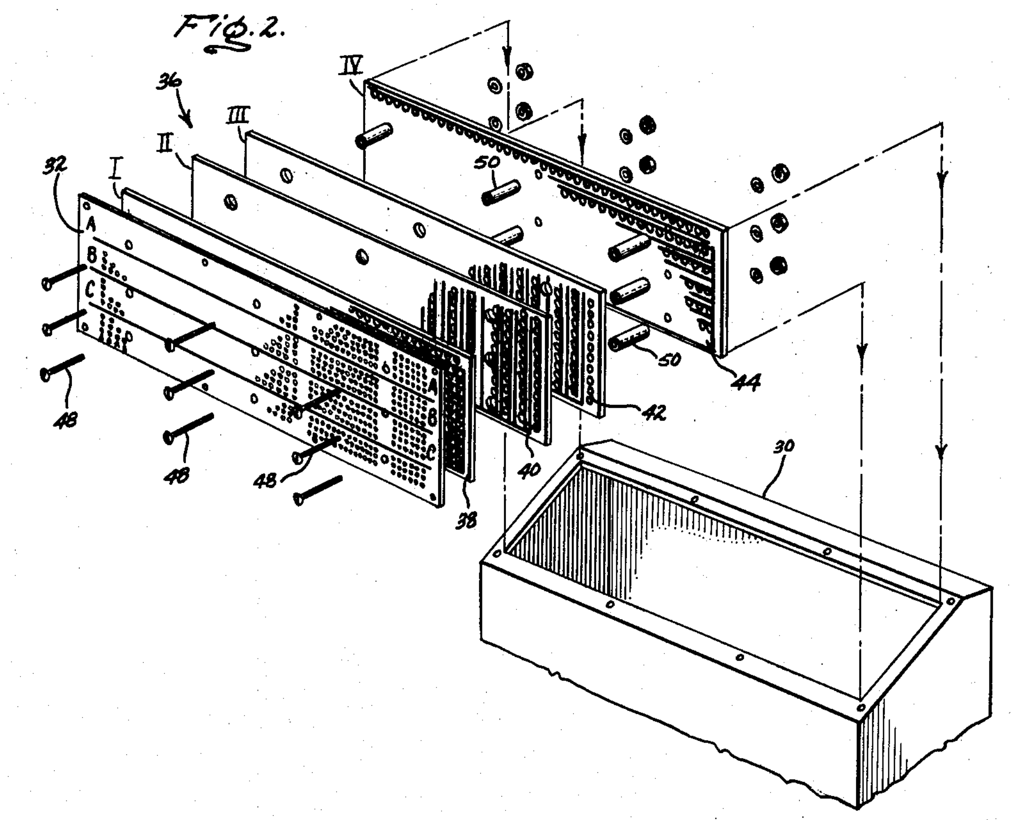
FIG. 2 is an exploded view of the matrix-switching assembly, installed in the console of FIG. 1.
Figure 1:
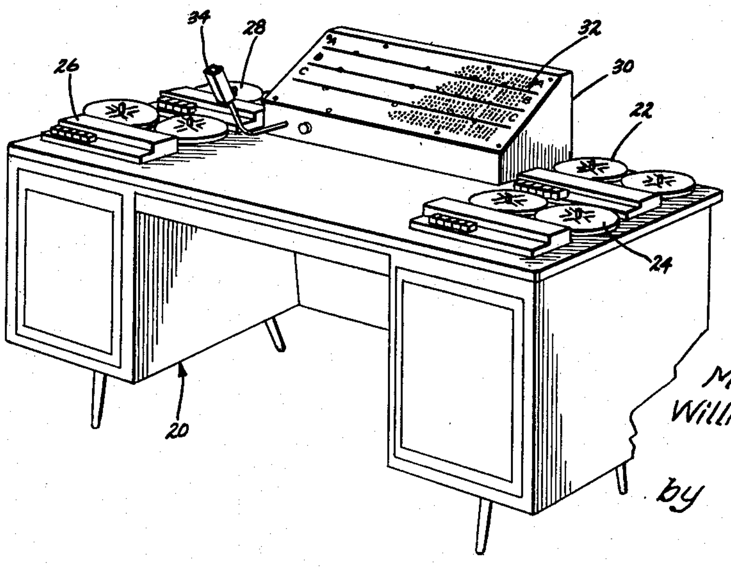
FIG. 1 is a perspective illustration of the instructor's console which contains a major portion of the equipment used in the entire system of this invention, this console being operated by the instructor in the control and supervision of the classroom instruction.

Referring to the drawings, and more particularly to FIG. 1, the teacher's console, indicated generally by the reference numeral 20, is in the form of a desk and contains almost all of the component circuitry in a complete system for use in teaching foreign languages to a class of, for example, thirty-six students. Mounted on the console top are a plurality of conventional magnetic tape decks, indicated generally by the numerals 22, 24, 26 and 28, respectively, and inside the console are mounted the instructor's amplifier as well as the student amplifiers and associated equipment. Located elsewhere in the classroom (not shown) are the student stations having at the individual locations essentially only a microphone, a volume control and a set of earphones for student use.

Also mounted on the console top is a small cabinet 30 having an inclined front panel 32, this cabinet containing a matrix-switching assembly as more clearly illustrated in succeeding FIGS. 2 through 11.

The instructor's console is also provided with a microphone 34 serving a purpose which will hereinafter be described in more detail.

Referring now to FIGS. 2 through 11, the matrix-switching assembly housed in the cabinet 30 will now be described. This matrix-switching assembly is generally indicated by the reference numeral 36 and comprises a front panel 32 (see FIG. 7), four printed circuit boards 38, 40, 42 and 44, and a base panel 46 secured in stacked parallel relation and spaced apart as hereinafter described. A series of bolts 48 pass through the various panels and insulator boards and receive thereon suitable sleeve-like spacers 50 interposed between the respective panels and boards to secure the same apart a predetermined distance as illustrated more clearly in FIG. 4.

Figure 7:
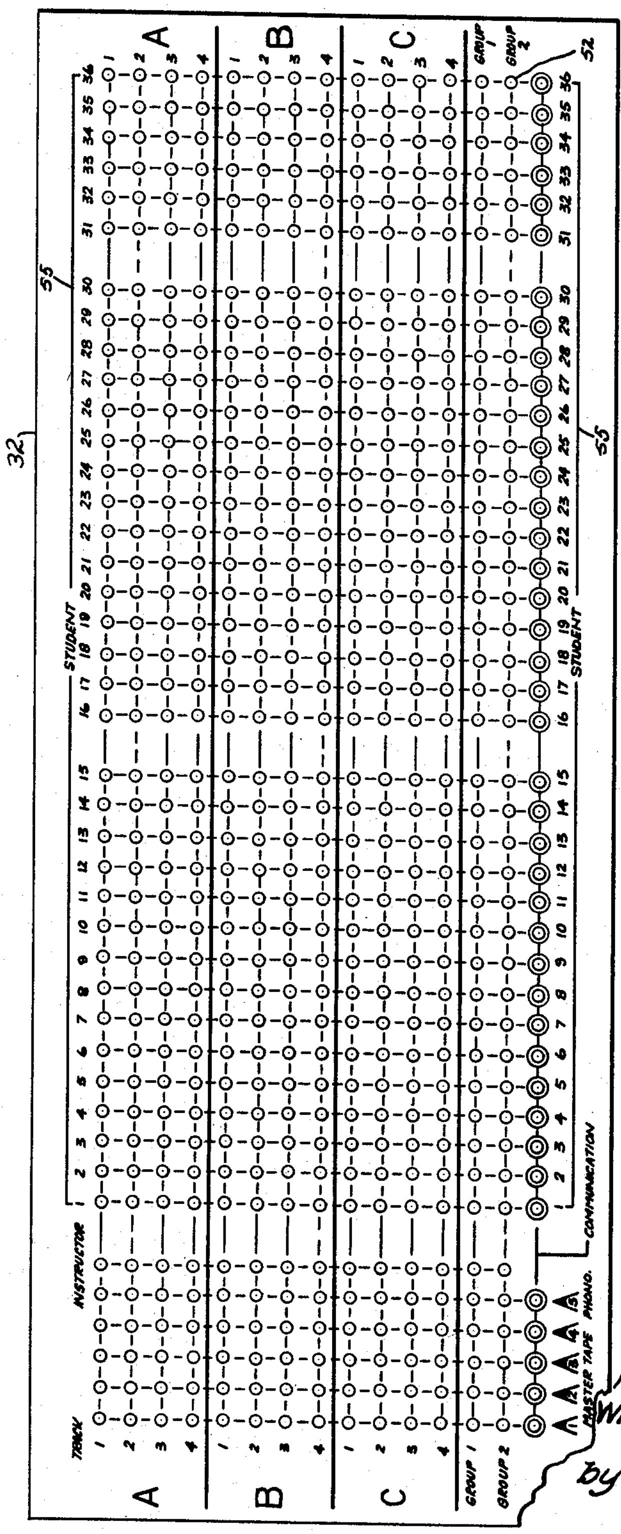
FIG. 7 is a front view of the control panel.

The panel 32 and the circuit boards 38, 40, 42 and 44 are provided with a plurality of apertures orthogonally arranged in columns and rows as illustrated in FIG. 7, all of these apertures in the panel and boards being arranged in identical patterns and in precise registry with each other. Thus, the apertures in the stacked assembly are aligned through the stack whereby a straight selector pin may be inserted completely therethrough as will be explained in more detail hereinafter. On the bottom panel 46 is mounted a plurality of copper-berryllium or the like detent springs 54 in registry with the apertures in the bottom board 44, these springs serving a purpose which will become apparent from the following description.

The panel 32, in addition to being provided with the plurality of apertures 52, has legending imprinted thereon as illustrated in FIG. 7. The major portion of the panel (i.e., the greater proportion of the apertures 52) is devoted to student positions, the word "STUDENT" being used in combination with bracket lines 55 to indicate those apertures related to student positions. In the panel of FIG. 7, it will be noted that thirty-six (36) student positions are provided for; however, it will appear as obvious to persons skilled in the art that any number of student positions may be used, depending upon the purposes to which the present invention is to be placed. Hereinafter, for purposes of convenience and brevity, only two student positions will be alluded to in the description, since the remaining student positions are duplicates, respectively, of these.

Figure 8:
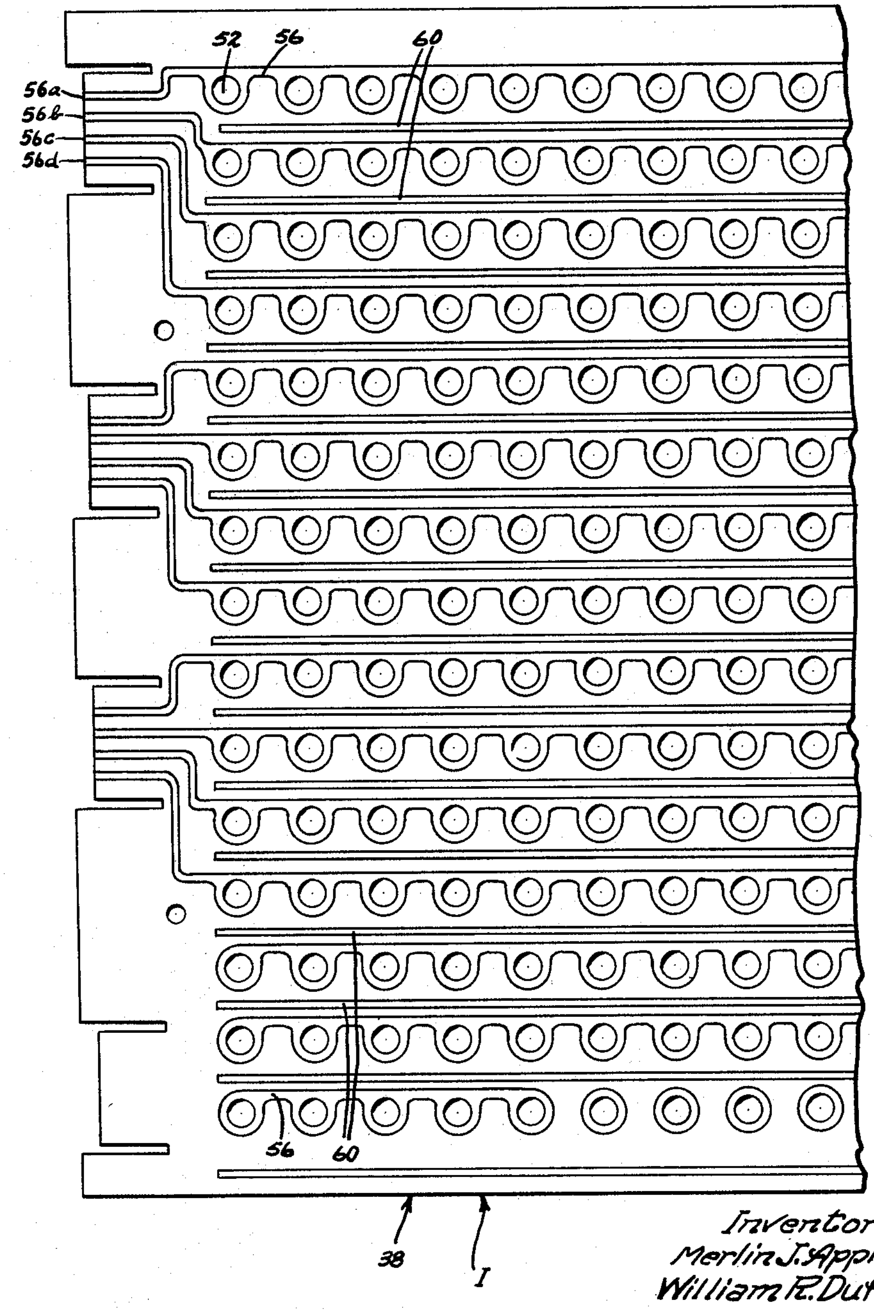
FIGS. 8, 9, 10 and 11 are front views of the four printed circuit boards, respectively, of the matrix-switching assembly of FIG. 2.

All of the matrix boards 38, 40, 42 and 44 have printed circuits thereon which register, in a precise manner, with the apertures in the respective boards. The circuit board 38 is illustrated in more detail in FIG. 8 and comprises a plurality of horizontal conductors 56 in registry with horizontal rows of apertures 52. Each aperture is provided with an eyelet or contact 58 (see FIG. 5) which physically resembles a metallic rivet, each eyelet making electrical contact with the respective horizontal conductor 56. Each eyelet, as obviously shown in FIG. 5, has an opening therethrough concentric with the respective aperture 52. As seen in FIG. 8, the eyelet contacts 58 are electrically connected together in horizontal, parallel rows for purposes which will become apparent from the following description.

In between the conductors 56 are disposed a plurality of second conductors 60 which are all conductively connected together and then to a reference ground potential for the purpose of minimizing electrical coupling or crosstalk between adjacent conductors 56. The conductors 56 and 60 are obviously insulated from each other by virtue of the fact that the board 38 is made of insulating material.

Figure 9:
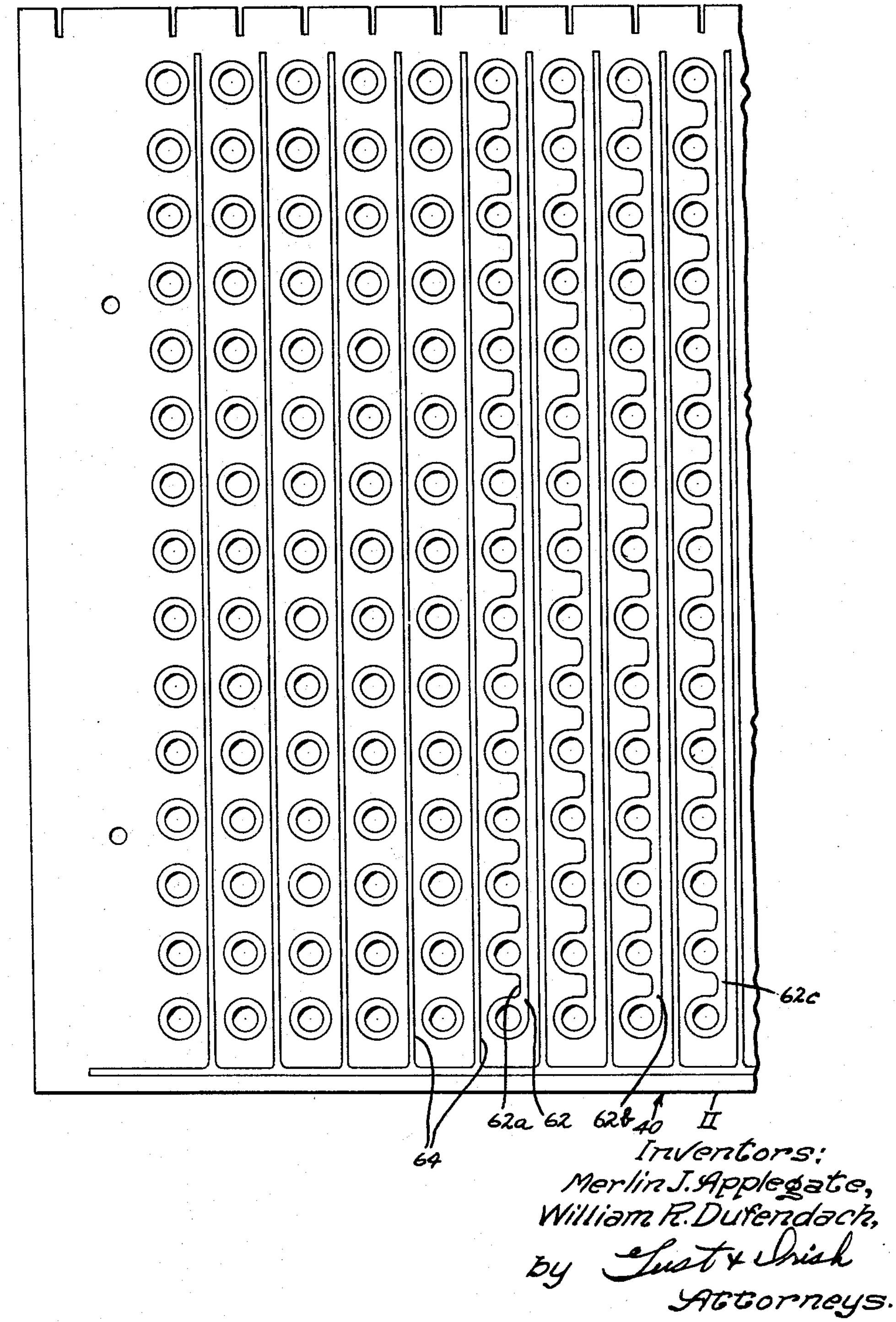

The board 40 is shown in detail in FIG. 9. It is provided with a series of vertically aligned and spaced-apart conductors 62 which interconnect respective eyelet contacts 58, each pair of these conductors 62 having interposed therebetween and insulated therefrom second conductors 64 which are all connected together and to a reference ground potential. As will be noted from a careful examination of this FIG. 9, the first five vertical rows of eyelet contacts 58 have no conductors 62 interconnecting the same; the reason for this will become apparent from the following description.

Figure 10:
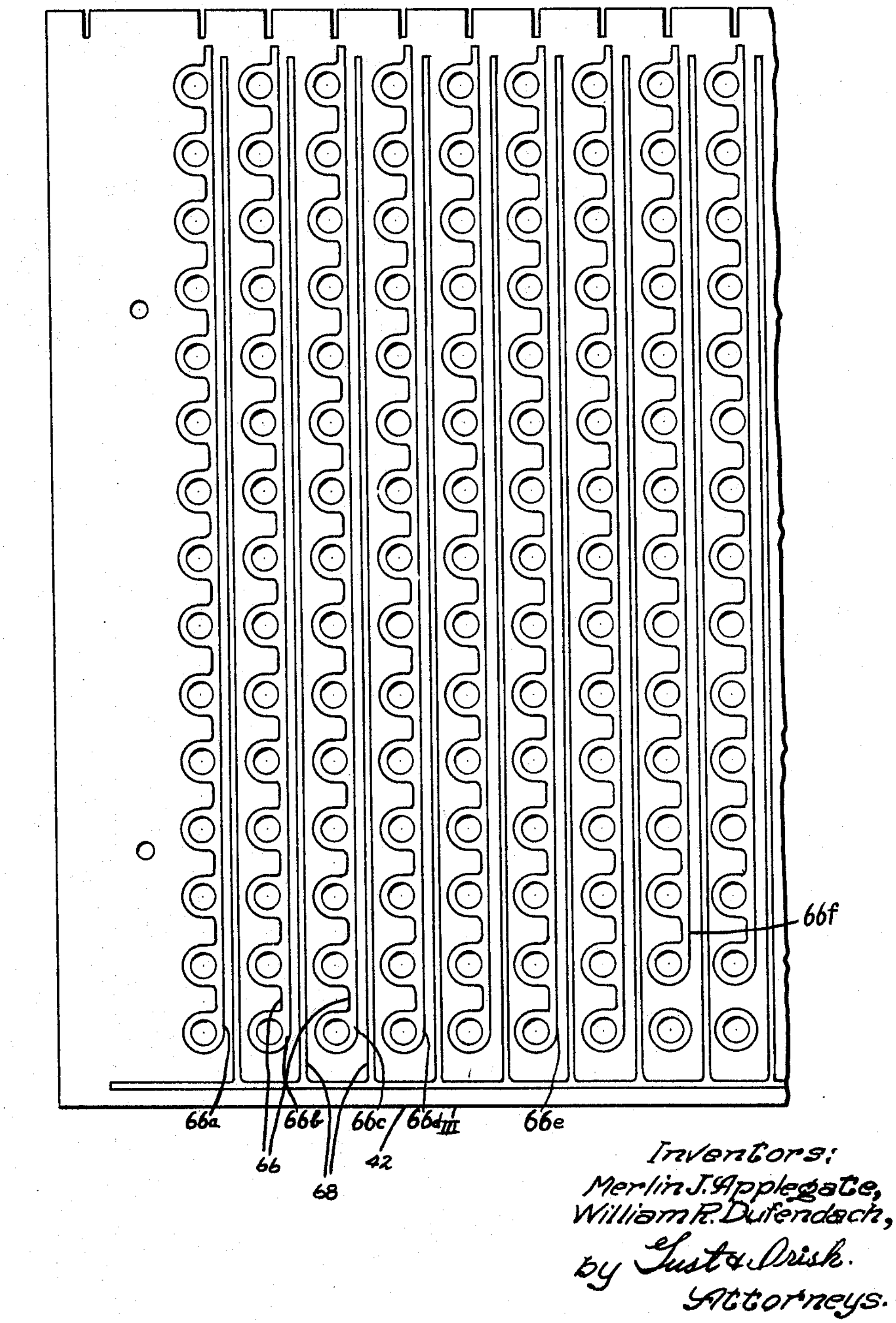

FIG. 10 illustrates the printed circuitry on the board 42. This board 42 closely resembles the board 40 of FIG. 9 in the respect that the eyelet contacts 58 are connected together in vertical, spaced-apart and parallel rows by conductors 66. These conductors 66 have interposed therebetween a plurality of other conductors 68 which are all connected together and grounded the same as previously described in connection with boards 38 and 40.

Figure 11:
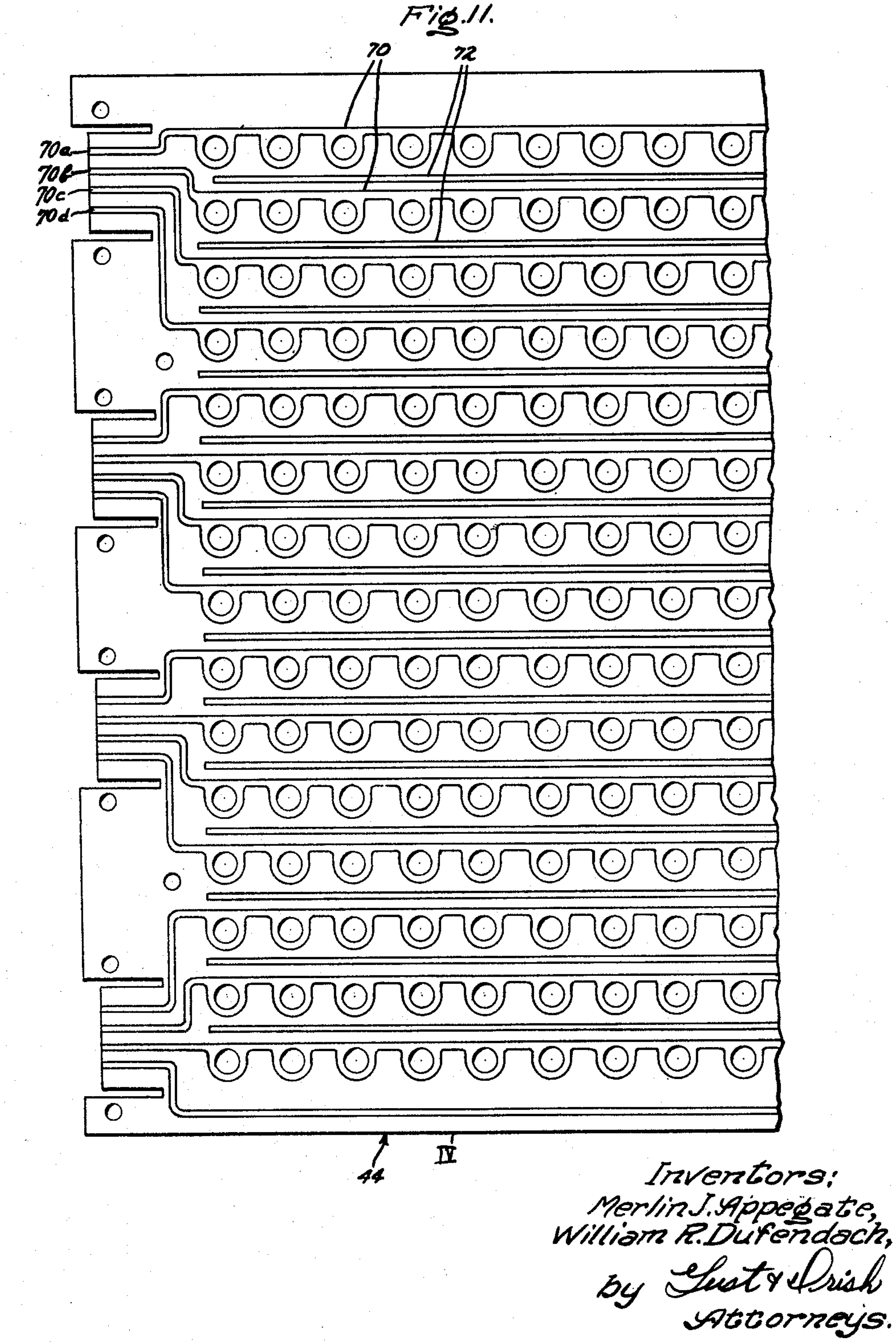

FIG. 11 illustrates the printed circuitry on the circuit board 44. This printed circuit closely resembles that of the board 38 (FIG. 8) in that horizontally arranged, parallel conductors 70 interconnect the horizontally aligned eyelet contacts 58. Interposed between these conductors 70' are a second series of conductors 72, all being connected together and grounded the same as in the preceding boards.

Figure 14:
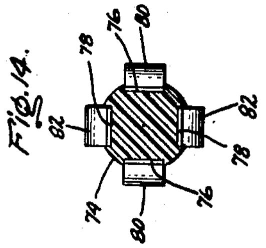
FIG. 14 is an end view of the selector pin of FIG. 12.
Figure 6:
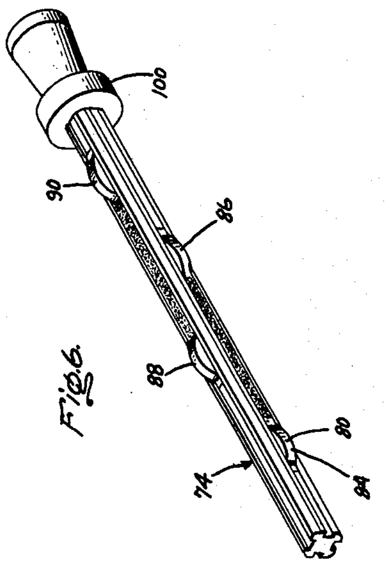
FIG. 6 is a perspective illustration of a selector pin.

Used in combination with the matrix-switching assembly 36 as just described are a plurality of selector pins 74, as shown more clearly in FIG. 6, made of some suitable insulating material, such as nylon or the like. Each pin is provided with four (4) longitudinally extending grooves spaced ninety degrees (90°) around the pin circumference. Two (2) of these grooves 76 are positioned diametrically opposite each other as shown more clearly in FIG. 14 as are the two grooves 78, the pair 76 being spaced angularly ninety degrees (90°) from the pair 78.

Secured in these grooves are respective metallic contacts. In the groove pair 76 are positioned two contacts 80, respectively, and in the groove pair 78 are positioned two identical contacts 82, respectively. Each contact 80, 82 is formed of an elongated strip of conductive spring metal, such as beryllium-copper, having a width substantially the same as the width of the companion groove 76, 78. The opposite end portions of the contacts are bowed upwardly to provide contact portions 84 and 86, respectively, for the contacts 80 and contact portions 88 and 90 for the contacts 82. The intermediate portions 94 and 96, respectively, of the two contacts 80 and 82 are adhered to the base of the respective grooves by some suitable insulating material, such as plastic, these intermediate portions 94 and 96 being thinner than the depth of the respective grooves so as to be recessed from the outer pin periphery. The importance of this recessing feature will become apparent from the following description.

The bowed portions 84, 86, 88 and 90 of the contacts are resilient and preformed to the shape illustrated in the drawings whereby they may be deflected radially inwardly and thereby exert a resilient outward contacting force.

Figures 3, 4, 5:
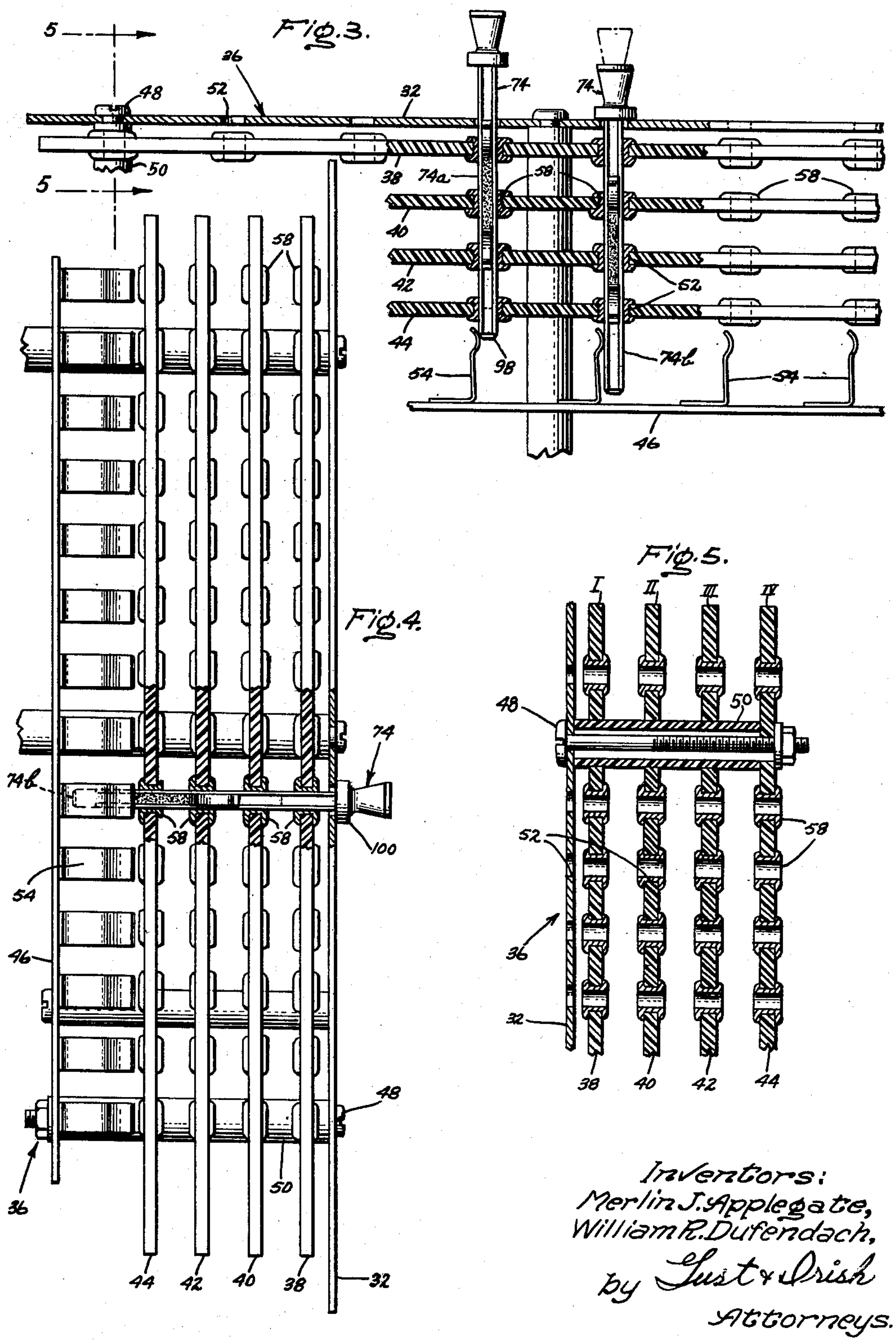
FIG. 3 is a side view of the matrix switching assembly with two different selector pins in two different positions respectively.
FIG. 4 is an end view of the matrix-switching assembly of FIG. 3 with a selector pin fully inserted.
FIG. 5 is a fragmentary, enlarged sectional view taken substantially along section line 5—5 of FIG. 3.
Figure 12:
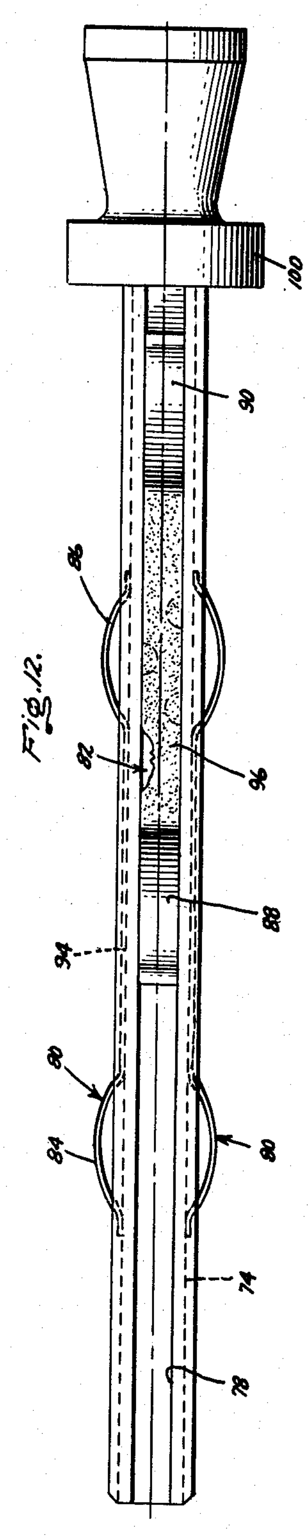
FIG. 12 is an illustration of a typical selector pin.
Figure 13:
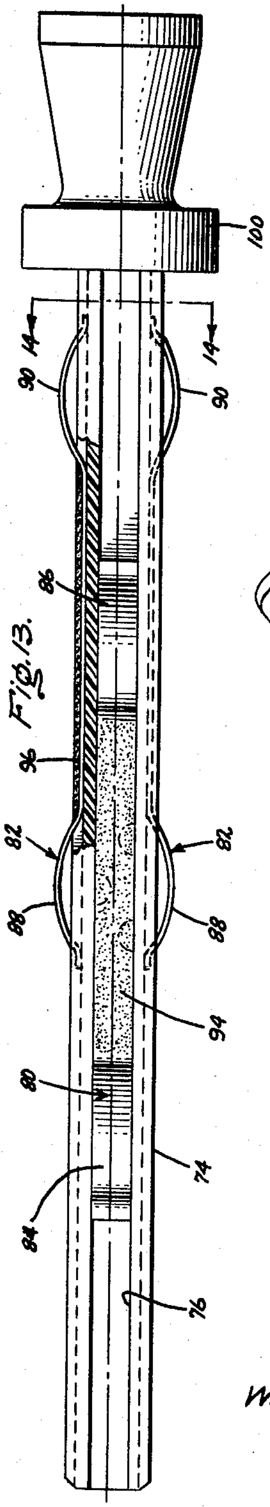
FIG. 13 is a view similar to FIG. 12 but rotated ninety degrees with respect thereto.

The selector pins 74 just described may now be considered in conjunction with the matrix-switching assembly 36. As seen more clearly in FIGS. 3 and 4, the pin 74 may be inserted through the aligned apertures in the panel 32 and circuit boards 38, 40, 42 and 44. With the spring detents 54 disposed in registry with the apertures of the board 44, the distal end 98 of the pin 74 will first contact the detent spring 54 for resiliently resisting further inward or insertion movement of the pin 74. The operator inserting the pin can feel this resistance and thereby receive an indication of the depth to which the pin has been inserted into the matrix assembly. By forcing the pin 74, it may be inserted past the detent end of the respective spring 54 to the position of the pin indicated by the reference numeral 74*b*, the head 100 of the pin engaging the panel 32 as shown in FIG. 4 for limiting this depth of penetration. Thus, as will appear in the following description, the selector pin has two operating positions, the first position being indicated in FIG. 3 by the reference numeral 74*a* and the second position being indicated by the reference numeral 74*b*.

When the pin 74 is inserted to the half-way position of 74*a* (FIG. 3), the bowed contact portions 84 and 86 make contact with the eyelets of only printed circuit boards 38 and 42, respectively. The eyelets contacted in these two boards are thereby connected together. As will now be appreciated, the bowed portions 84 and 86 are spaced apart the same distance as the spacing between the two boards 38 and 42. Similarly, when the pin 74 is depressed to its "FULL DOWN" position (see FIGS. 3 and 4), the eyelets 58 in the two boards 40, 44 are connected together by the bowed contact portions 84 and 86 while the eyelets of the two boards 38 and 42 are connected together by the contacts portions 88 and 90, respectively. Now again, it will be appreciated that the spacing between the boards 40 and 44 must conform to the distance between the contact portions 84 and 86, and the spacing between the boards 38 and 42 must correspond to the spacing between the contact portions 88 and 90, respectively. With the pin 74 depressed to its "FULL DOWN" position, the eyelets of boards 40 and 44 will be connected together while the eyelets of the two boards 38 and 42 will be connected together. The eyelets of adjacent boards are never connected together.

As will become apparent from the following description, a multiplicity of pins 74 are used to make desired system connections.

In the following, the matrix-switching assembly 36 is described as connected into a complete, operative classroom system. FIGS. 15, 16*a* and 16*b* are simplified and equivalent circuit diagrams of such a system, only a minimum number of component circuits and portions of the matrix 36 being shown for convenience and clarity in illustrating and describing the invention.

At this point, the circuit boards 38, 40, 42 and 44 will be referred to, respectively, by the Roman numerals I, II, III and IV. In FIG. 15*b*, the block 102 represents a conventional magnetic tape recording and reproducing device which comprises the usual tape transport 104, a transducer (not shown), a playback amplifier 106, a recording amplifier 108, and a single-pole double-throw switch 110 used to diagrammatically illustrate that the same tape deck or combination tape transport and transducer may be used selectively with either the playback amplifier 106 or recording amplifier 108.

The output circuit, indicated generally by the numeral 112 of the playback amplifier 106 is shown in FIG. 15*a* as being connected to the top, horizontal line 56 of circuit board I. While only a single tape recording and reproducing mechanism 102 has been shown, as will become apparent from the following description, the present invention contemplates the use of a plurality of such mechanisms without departing from the scope of this invention. For example, and considering only FIG. 15*b*, four (4) such mechanisms 102 may be used in the illustrated system, the playback amplifier output circuit of each mechanism being connected to a different respective one of the horizontal conductors 56 of circuit board I. If four (4) such mechanisms 102 are used, the output circuits of the playback amplifiers thereof would be connected to the first four lines 56 respectively of circuit board I as indicated (FIG. 15*a*) by the numerals 56*a*, 56*b*, 56*c* and 56*d*, respectively.

Instead of using four (4) such mechanisms, a single tape deck having four recording channels or tracks thereon may be used, the four output circuits of the electrical apparatus used to reproduce the information on these four tape tracks being connected to the four lines 56*a*, 56*b*, 56*c* and 56*d*, respectively. In a preferred operating embodiment of this invenition, the mechanism 102 is of this latter design; i.e., the tape deck providing for the recording and playing back on four tracks of a single tape. For purposes of correlating the various figures in the drawings, the lines 56*a*, 56*b*, 56*c* and 56*d* of circuit board I correspond to the four horizontal rows of apertures 52 in FIG. 7, identified collectively by the letter "A." The letters "B" and "C" on this panel 32 indicate that two additional four-track tape decks 102 are connected to the horizontal lines (not shown) of circuit board I of FIG. 15*a*, thereby providing a total of twelve (12) horizontal lines on the circuit board I which are connected to as many recording channels on three (3) tape decks, these tape decks being, for example, tape decks 22, 24 and 26 of FIG. 1. For purposes of convenience and clarity in describing the invention, only a single tape-recording mechanism 102 is illustrated since the other mechanisms and circuitry are duplicates.

As some eyelet contacts on the various circuit boards have no connections thereto, these eyelets are not indicated in the circuit diagram of FIGS. 15*a* and 15*b*. An example of this omission of contacts appears in FIG. 15*a* in connection with circuit board I wherein only five (5) eyelet contacts are indicated on the bottom horizontal line 56*e*.

Considering now the circuit board III, a magnetic tape reproducing mechanism 114 has an amplifier 116, the output circuit 118 of this amplifier being connected to the first vertical line 66*a* of the board III. Three (3) additional mechanisms 114 may also be connected, respectively, to the remaining vertical lines 66*b*, 66*c* and 66*d*, but since these are duplicates of the mechanism and circuitry illustrated, they are not shown nor described.

The mechanism 114 may, for all practical purposes, be conventional and identical to the playback portion of the mechanism 102, mechanism 114 serving to reproduce only the information on the magnetic tape instead of performing any recording function.

With respect to circuit board IV (FIG. 15*b*), the top circuit line 70*a* is connected to the input circuit for the recording amplifier 108 of the mechanism 102. As is true in the case of circuit board I, a plurality of such recording amplifiers may be connected to the remaining horizontal lines 70*b*, 70*c* and 70*d*, respectively, in order to provide for additional recording facilities.

In the instructor's console 20 is an amplifier 120 having an input circuit 122. As seen in FIG. 15*a*, the amplifier is contained in four amplifier stages utilizing transistors 123, 126, 128 and 130, respectively, these transistors being connected in cascade to produce audio output signals in response to like signals applied to the input circuit 122.

A first output circuit, indicated by the reference numeral 124, is preferably at low impedance and in a practical design is twenty (20) ohms. This output circuit is connected to the bottom line 56*e* of circuit board I. A line 126*a* connected to the instructor's amplifier 120 is coupled to the emitter of transistor 126 and the base of transistor 128. This line 126*a* thereby serves as an output line or circuit for the two amplifier stages 123 and 126 and simultaneously serves as an input line or circuit for the two final amplifier stages 128 and 130. This feature will be explained more fully in the following.

This line 126*a* is connected to line 62*a* of circuit board II (FIG. 15*a*) as shown. This line 126*a* is also connected to the bottom aperture contact line 70*e* on circuit board IV (FIG. 15*b*).

While there may be relatively large number of student stations, for clarity of illustration and description, FIG. 15*b* illustrates only the presence of two (2) such stations, these being identified respectively by the reference numerals 127 and 129. In these student stations are individual amplifiers, respectively, 131 and 132, the amplifier 131 having connected thereto a final amplifier stage 131*a* and the amplifier 132 having connected thereto an identical final amplifier stage 132*a*. As illustrated, ear phone 134 and 136 are connected to the output circuits of the two final stages 131*a* and 132*a*.

The input circuit 138 to the amplifier 131 is connected to the vertical line 66*f* on circuit board III. Similarly, the input circuit 140 to the amplifier 132 is connected to the prinited circuit line 66*g* of circuit board III. Coupled in parallel with the input circuit 138 is a microphone 142, another microphone 144 being coupled in parallel with its companion input circuit 140. A line 146 which may be considered as the output circuit of the amplifier 131 and the input circuit of 131*a* is connected to the vertical line 62*b* of the circuit board II. Similarly, a line 140*a* extending from the amplifier 132 is connected to the vertical line 62*c* of circuit board II.

Additional student stations (not shown) are connected to other vertical lines (not shown) on circuit boards II and III in a manner identical to that for stations 127 and 129 just described.

The input circuit 122 of instructor's amplifier 120 is connected to the vertical line 66*e* of circuit board III (FIG. 15*b*).

The amplifiers used in conjunction with the student stations 127, 129, etc., are identical in a preferred embodiment of this invention, and the circuit diagram for an operating embodiment of this amplifier is illustrated in FIG. 17. The values of the component parts for this amplifier are given at the end hereof.

The amplifier 116 used in the playback mechanism 114 is illustrated in FIG. 18, the component values of this operative circuit being given at the end hereof.

Similarly, an operative circuit diagram of the playback and recording amplifiers 106 and 108, respectively, of the mechanism 102 is illustrated in FIG. 19, the component values being listed at the end hereof.

Lastly, the values of the component parts of the instructor amplifier are given at the end hereof.

In the following, the operation of the system will be described. Only a few of the more commonly desired circuit configurations will be described, but as will become apparent, many more configurations are possible.

*Lesson to Student—Condition A*

A master language lesson to be transmitted to one or more students is prerecorded on a magnetic tape which is placed on the master lesson playback deck 114 (for example deck 28, FIG. 1). In one type of lesson, pauses are provided between foreign language expressions during which the student may respond orally either in the foreign language or in a translation thereof. The coupling of this lesson to student station 127 is made in the following manner. A selector pin 74 is inserted into the matrix-switching assembly 36 to make connection between between the top line 56*a* of circuit board I and the left-hand line 66*a* of circuit board III. To make this connection, a pin 74 is inserted half-way or fully to make the circuit connection as indicated by the dashed line "M." The arrow on this line indicates the direction of the signal transmission. A second selector pin 74 is inserted half-way into the matrix-switching assembly 36 to make the circuit connection indicated by the letter "R." By virtue of these two connections "M" and "R," the amplifier 116 of the master lesson tape deck is connected to the input circuit 138 of a student amplifier. The student then hears the lesson in his earphones 134. The same lesson may be transmitted to other students by inserting additional pins 74 into apertures of the matrix 36 corresponding to the student stations as desired.

*Master Lesson to Student and Return to Record—Condition B*

Again referring to FIGS. 15*a* and 15*b*, it is desired in this mode of operation for the student not only to receive the master lesson but to respond orally and have both his oral responses and the master lesson recorded by the mechanism 102. The circuit connections for accomplishing this result involve the following:

The selector pins 74 represented by the letters "M" and "R" are inserted as indicated in the diagram, the pin "R" being inserted fully to make connections between circuit boards I and III and also between circuit boards II and IV, respectively. The student receives the master lesson the same as previously described for Condition A, and his responses in the microphone 142 are coupled from his amplifier 131 through the line 146 through the pin "R" (fully inserted) to the top line 70*a* of circuit board IV. From this top line 70*a*, the signal passes to the recording amplifier 108 and from there to be recorded on the magnetic tape. Potentiometer 222*a* (FIG. 19) is adjusted to provide the proper level of audio signal to the recording head (not shown). Since the student's microphone 142 is effectively coupled in parallel with the input circuit 138 which receives the master lesson, both the master lesson and the student responses will be recorded by the tape on transport 104. The student can adjust the level of volume of his earphones by means of potentiometer 154 without affecting the level of the signal to the recording head.

By inserting the proper pins 74, any selected student may so record his responses along with the master lesson.

*Playback of Information Recorded During Condition B for the Student Only To Listen—Condition C*

The selector pin 74 represented by the letter "M" is removed. This decouples the output circuit of the master lesson amplifier from the playback amplifier 106 of the mechanism 102, this coupling preventing excessive loading of this amplifier 106. The pin 74 represented by the letter "R" is moved to either its fully or half depressed positions. The switch 110 of the mechanism 102 is moved to the playback position and the tape transport apparatus 104 is placed in operation. The signal passes from the magnetic tape through the playback amplifier 106 to the top line 56*a* of circuit board I, and from this circuit board I via the pin circuit "R" to circuit board III and from here it passes to the input circuit 138 of the student amplifier. The student hears the playback of the master lesson and his responses in his earphones 134.

*Communication Between Student and Instructor—Condition D*

In certain instances, it is desirable to provide for direct communication between the instructor and the student. In general, this is accomplished by interconnecting the instructor's amplifier 120 and the student's amplifier 131. This is accomplished by using only a single selector pin 74 represented in FIGS. 15*a* and 15*b* by the letter "N." This pin 74 is moved to the point to connect the bottom line 70*e* of board IV with the vertical line 62*b* of circuit board II. This serves to connect the instructor's circuit 126*a* with the student circuit 146. The instructor speaks in his microphone connected to the input jack 150 which is coupled in shunt with the input circuit 122. The audio signal passes from the amplifier 120 over the line 126*a*, along pin circuit "N," line 146, through the final amplifier stage 131*a* to the student's earphones 134. Communication from the student to the instructor occurs by the student speaking into his microphone 142, the signal from his amplifier 131 feeding in reverse direction over the line 146, pin circuit "N," 126*a*, through the instructor amplifier circuit 128, and from there to the instructor's earphones connected to the output jack 152.

At this point it should be recognized that both the instructor and the student are able to adjust their respective receiving volumes without affecting the volume of the signal in the other's earphones. This is accomplished by placing the volume control in the student station in the final amplifier stage 131*a* which follows connection of the line 146. This volume control in FIG. 17 is indicated by the numeral 154 and is connected between the transistor emitter and reference ground potential.

In the instructor's amplifier 120, the volume control is indicated by the reference numeral 156, this being connected in the emitter circuit of the transistor 128. Close inspection will show that this emitter circuit has no bearing on the level of the signal which is transmitted from the instructor's amplifier over the line 126*a*. Thus, both the instructor and the student are able to adjust the volume of each other's voices in their respective earphones without affecting the other's volume.

Obviously, any other selected student may be placed in communication with the instructor by inserting a selector pin 74 in the corresponding aperture of the matrix 36.

*Communication From Instructor to Student During Condition A—Condition E*

Occasionally it is desirable for the instructor to communicate with the student (or class) while the latter is receiving the master lesson. In order to accomplish this for student station 127, pin "M" is inserted, pin "R" is inserted half-way, and pin "O" is inserted. The student receives the master lesson the same as during Condition A described hereinabove. The instructor's transmission to the student occurs via the instructor's output circuit 124, the bottom line 56*e* of circuit board I, pin circuit "O," line 66*a* on circuit board III, pin circuit "M," top line 56*a* of the circuit board I, pin circuit "R," and line 138 to the student amplifier 131. With these circuit connections, the student hears both the master lesson and the instructor's speech, but the lesson is attenuated because of the low impedance of the instructor's output circuit 124. In the specific circuitry disclosed, the impedance of the instructor's output circuit 124 is approximately twenty (20) ohms. The output impedance of the master lesson amplifier 116 is, for example, approximately two hundred (200) ohms, such that coupling this output circuit in parallel with the instructor's output circuit 124 results in attenuation of the master lesson output signal, thereby permitting the instructor's speech to dominate that of the master lesson. The student is thus able to hear the instructor without the master lesson interfering.

*Student-to-Student Communication—Condition F*

When it is desired to establish communication between two students, only pins "P" and "Q," as illustrated in FIGS. 15*a* and 15*b* are used. These pins are fully inserted, thereby establishing connections between circuit boards II and IV, respectively, The student stations 127 and 129 are thereby interconnected as follows:

Output line 146 connects to line 62*b* of circuit board II, pin circuit "P," line 70*f* of circuit board IV, pin circuit "Q," line 62*c* of circuit board II, line 148, and the input circuit of the final stage 132*a* of student station 129.

Transmission from microphone 142 of station 127 to the earphones 136 of the station 129 passes through the amplifier 131, line 146, through circuit boards II and IV, line 148, final amplifier stage 132*a* and then to the earphones 136. Similarly, transmission from the microphone 144 to the earphones 134 occurs through the circuit 132, 148, circuit boards II and IV, line 146, and amplifier 131*a* to the earphones 134. As is true of all of the intercommunications circuits, the final stages 131*a* and 132*a* of the student stations contain the respective volume controls whereby each student may adjust the level of the volume in his earphones without affecting the other student's volume.

Other students may be placed in communication with each other by inserting pins 74 corresponding to circuits "P" and "Q" in the corresponding apertures of matrix 36 for such students' positions.

*Instructor Recording on Record-Playback Mechanism 102—Condition G*

It is often desirable for the instructor to make a recording of a lesson to be used on the master lesson tape deck. This is accomplished by using only a single pin 74 corresponding to pin circuit "T," this pin being fully inserted. This results in circuit boards I and III being interconnected as well as boards II and IV. The circuit established extends from the instructor's amplifier 120 and more specifically output circuit 126*a* to line 62*a* of circuit board II, pin circuit "T," line 70*a* of circuit board IV, and out to the record amplifier 108. The instructor's speech is thus recorded by the tape transport 104, the switch 110 being connected to the record amplifier 108.

While the circuit boards I and III are interconnected by the pin circuit "T," this circuit is not used during this recording operation.

*The Instructor Listening During Condition A—Condition H*

It is often necessary for the instructor to determine the character of the particular lesson being transmitted to a particular student. This is accomplished by using selector pins 74 corresponding to pin circuits "M," "R" and "T," the selector pins being inserted half-way. The master lesson is picked off the top line 56*a* of circuit board I, carried by the pin circuit "T" to the line 66*e* of circuit board III and thence back to the input circuit 122 of the instructor amplifier 120. The instructor then hears the same lesson that the student is receiving.

Only a few of the possible circuit permutations have been given. It will appear obvious to the person skilled in the art after a further study of the switching circuitry disclosed that an innumerable number of the same and different circuit combinations may be achieved. For example, when it is considered that a total of four (4) master lesson tapes or tracks like the one represented by numeral 114 may be fed simultaneously to the lines 66*a*, 66*b*, 66*c* and 66*d* of circuit board III and a total of twelve (12) playback and record circuits may be connected to the circuit lines on boards I and IV, respectively, corresponding to the sections A, B and C of FIG. 7, it will immediately be appreciated that a great many different circuits may be operating independently but simultaneously with respect to each other whereby many of the same and different lessons may be given to various members of the class simultaneously. Two or more students may receive the same lesson, while others receive a different lesson. Also, other students may be recording and/or communicating with the instructor or with each other.

In FIGS. 16*a* and 16*b*, simplified block diagrams of the circuitry of FIGS. 15*a* and 15*b* are given for the purpose of providing a simplified version of the different possible student system connections. It will be understood, of course, that these diagrams represent vastly simplified circuits, since with the addition of a plurailty of master lesson tracks, record-playback mechanisms and student stations, the various circuits become quite complicated and varied. In these FIGS. 16*a* and 16*b*, like reference numerals indicate like parts.

In the operation of the entire system, the instructor may sit at the console 20 of FIG. 1 during the full time of operation. All of the tape decks 22, 24, 26 and 28 corresponding to the master lesson deck 114 and the record-playback decks 102, are easily within the instructor's reach and control as is the matrix-switching assembly 36. The switching panel 32 (FIG. 7) is conveniently and clearly imprinted with the necessary system data whereby the instructor by the mere insertion of selector pins into the proper apertures may complete the various circuits as already explained. The panel of FIG. 7 is set up to handle a total of thirty-six (36) students, twelve (12) record-playback channels, four (4) master lesson channels, an instructor's channel, a phonograph input channel, and circuits denominated "GROUP 1" and "GROUP 2" whereby the instructor may communicate with either one or two groups of the thirty-six students simultaneously or separately.

As already explained, the achievement of these innumerable possible circuit combinations is attributable in part to the unique switching matrix 30 which makes use of printed circuits and avoids all use of rotary and the like switches. Through the use of this unique switching apparatus, a very large percentage of the soldered connections which would normally be used are eliminated. For example, for a class of thirty-six students, a total of nine-hundred sixty-nine (969) soldered connections would be needed for a total of fifty-one (51) rotary type switches. The matrix switching assembly 36 of this invention requires only ninety-six (96) connections and these are made at the edges of the circuit boards. The chance of making poor soldered connections is reduced by a ratio of approximately 11-to-1.

Also, the reliability and ruggedness of the system are improved while at the same time the size of the overall assembly is reduced. There is also accomplished a more facile selection of a particular program or circuit combination and the identification of the same. The total system provides all of the electronic facilities needed without placing any kind of an unusual operating burden on the instructor. This system provides for complete flexibility in the utilization of all of these electronic facilities. Of primary importance is the fact that this flexibility provides for individualized instruction in a classroom containing a multiplicity of students, this individualized instruction permitting the students to progress as rapidly as their individual abilities will permit.

In FIGS. 17, 18 and 19 appear operative diagrams for the system components already described. In the following are listed the values of the component parts for these circuits, it being understood that these values are given only as an exemplification of one embodiment of this invention and not as a limitation thereto.

*Student Amplifier—FIG. 17*

| | | |
|---|---|---|
| Resistor 160 | ohms | 100,000 |
| Resistor 161 | do | 120,000 |
| Resistor 162 | | (selected) |
| Resistor 163 | ohms | 6,800 |
| Resistor 164 | do | 12,000 |
| Resistor 165 | do | 1,800 |
| Resistor 166 | do | 10,000 |
| Potentiometer 164 | do | 1,500 |
| Capacitor 167 | microfarads | 50 |
| Capacitor 168 | do | 50 |
| Capacitor 169 | do | 50 |
| Capacitor 170 | do | 2 |
| Capacitor 171 | do | 50 |
| Transistors 172, 173, 174 | | 2N1370 |

*Master Lesson Amplifier—FIG. 18*

| | | |
|---|---|---|
| Resistor 175 | ohms | 10,000 |
| Resistor 176 | do | 150 |
| Resistor 177 | | (selected) |
| Resistor 178 | ohms | 22,000 |
| Resistor 179 | do | 39,000 |
| Resistor 180 | do | 15,000 |
| Resistor 181 | do | 270 |
| Resistor 182 | do | 750 |
| Resistor 183 | do | 1,500 |
| Resistor 184 | do | 22,000 |
| Resistor 185 | do | 6,800 |
| Resistor 186 | do | 1,500 |
| Resistor 187 | do | 1,000 |
| Capacitors 188, 189, 190 | microfarads | 50 |
| Capacitor 191 | do | .33 |
| Capacitor 192 | do | .15 |
| Capacitor 193 | do | .018 |
| Inductance 194 | millihenries | 50 |
| Transistors 195, 196, 197, 198 | | 2N1370 |

*Record-Playback Amplifiers—FIG. 19*

| | | |
|---|---|---|
| Resistor 199 | ohms | 10,000 |
| Resistor 200 | do | 91,000 |
| Resistor 201 | do | 10,000 |
| Resistor 202 | do | 47,000 |
| Resistor 203 | | (selected) |
| Resistor 204 | ohms | 22,000 |
| Resistor 205 | do | 22,000 |
| Resistor 206 | do | 390 |
| Capacitor 207 | microfarads | .0022 |
| Capacitor 208 | do | 2 |
| Transistor 209 | | 2N1370 |
| Transistor 210 | | 2N1371 |
| Resistor 211 | ohms | 10,000 |
| Resistor 212 | | (selected) |
| Resistor 213 | ohms | 22,000 |
| Resistor 214 | do | 150 |
| Resistor 215 | do | 39,000 |
| Resistor 216 | do | 15,000 |
| Resistor 217 | do | 270 |
| Resistor 218 | do | 750 |
| Resistor 219 | do | 22,000 |
| Resistor 220 | do | 1,500 |
| Resistor 221 | do | 2,200 |
| Resistor 222 | do | 2,200 |
| Resistor 222*a* | do | [1] 15,000 |
| Capacitors 223, 224 | microfarads | 50 |
| Capacitor 225 | do | .33 |
| Capacitor 226 | do | .15 |
| Capacitor 227 | do | .018 |
| Capacitor 228 | do | 2 |
| Capacitor 228*a* | do | 50 |
| Inductance 229 | millihenries | 50 |
| Transistors 230, 231, 232 | | 2N1370 |

[1] Recording level control.

*Instructors Amplifier 120—FIG. 15*

| | | |
|---|---|---|
| Resistor **233** | ohms | 100,000 |
| Resistor **234** | do | 120 |
| Resistor **235** | | (selected) |
| Resistor **236** | ohms | 6,800 |
| Resistor **237** | do | 1,200 |
| Resistor **238** | do | 1,800 |
| Resistor **239** | do | 2,200 |
| Capacitor **240** | do | 8,200 |
| Capacitor **241** | do | 2,200 |
| Capacitors **242, 243, 244, 245** | microfarads | 50 |
| Capacitor **246** | do | 2 |
| Capacitor **247** | do | 30 |
| Transistors **124, 126, 128** | | 2N1370 |
| Transistors **130** | | 2N1374 |

While we have described above the principles of my invention in connection with specific apparatus, it is to be clearly understood that this description is made only by way of example and not as a limitation to the scope of our invention.

What is claimed is:

1. In combination, a matrix-switching assembly comprising four contact-supporting members assembled in fixed relation, said members each having identical patterns of electrical contacts thereon, the contacts respectively of said members being in registry; a recording-reproducing device having input and output circuits respectively, said output circuit being coupled to preselected contacts of the first of said members, said input circuit being coupled to preselected contacts of the fourth of said members; an instruction amplifier having first and second input circuits and first and second output circuits, the first input circuit being coupled to preselected contacts of the third of said members, the first output circuit being coupled to other preselected contacts of said first member, said second input and output circuits being coupled to other preselected contacts of the second and fourth members, respectively; said instruction amplifier including means for providing amplified signals in said first output circuit in response to signals applied to said first and second input circuits, means for providing amplified signals in said first output circuit in response to signals applied to said second input circuit, and means for providing amplified signals in said second output circuit in response to signals applied to said first input circuit; a first source of electrical signals coupled to other preselected contacts of said third member; at least one student amplifier having input and output circuits, different other preselected contacts of the third member coupled to the input circuit of said student amplifier, different other preselected contacts of the second member coupled to the output circuit of said student amplifier, means coupled to the output circuit of said student amplifier for providing audible sounds in response to audio signals applied to the input circuit thereof; microphone means coupled to the input circuit of said student amplifier, means coupled to the first output circuit of said instructor's amplifier for providing an audible signal in response to an audio signal applied to one of said input circuits thereof; microphone means coupled to one of the input circuits of said instructor's amplifier; and means for selectively interconnecting the respective contacts of said contact-supporting members whereby said recording-reproducing device, said instructor's amplifier, said source, and said student amplifier may be selectively coupled together.

2. The combination of claim 1 wherein said interconnecting means includes a plurality of switch elements individually movable to interconnect selected registered contacts of said four members whereby said recording-reproducing device, said instruction amplifier, said first source and said student amplifier may be selectively coupled together.

3. In combination, a matrix-switching assembly comprising four circuit boards assembled in stacked relation, said boards having identical patterns of apertures therein, the apertures of the respective boards being in registry, said apertures each being provided with a switch contact; a recording-reproducing device having input and output circuits respectively, said output circuit being coupled to preselected contacts of the first of said boards, said input circuit being coupled to preselected contacts of the fourth of said boards; an instruction amplifier having first and second input circuits and first and second output circuits, the first input circuit being coupled to preselected contacts of the third of said boards, the first output circuit being coupled to other preselected contacts of said first board, said second input and output circuits being coupled to other preselected contacts of the second and fourth boards, respectively; said instruction amplifier including means for providing amplified signals in said first output circuit in response to signals applied to said first and second input circuits, means for providing amplified signals in said first output circuit in response to signals applied to said second input circuit, and means for providing amplified signals in said second output circuit in response to signals applied to said first input circuit; a source of recorded signals coupled to other preselected contacts of said third board; and at least one student amplifier having input and output circuits, different other preselected contacts of the third board being coupled to the input circuit of said student amplifier, different other pre-selected contacts of the second board being coupled to the output circuit of said student amplifier, means coupled to the output circuit of said student amplifier for providing audible sounds in response to audio signals applied to the input circuit thereof; microphone means coupled to the input circuit of said student amplifier, means coupled to the first output circuit of said instructor's amplifier for providing an audible signal in response to an audio signal applied to one of said input circuits thereof; microphone means coupled to one of the input circuits of said instructor's amplifier; and means for selectively interconnecting the respective contacts of said registered apertures whereby said recording-reproducing device, said instructor's amplifier, said source, and said student amplifier may be selectively coupled together.

4. The combination of claim 3 wherein said interconnecting means includes a plurality of selector pins individually movable in the registered apertures of said boards for interconnecting the respective contacts of said registered apertures whereby said recording-reproducing device, said instruction amplifier, said source and said student amplifier may be selectively coupled together.

5. The combination of claim 3 wherein said interconnecting means includes a plurality of selector pins individually movable in the registered apertures of said boards for selectively interconnecting the respective contacts of said registered apertures in the first and third boards respectively and the second and fourth boards respectively, whereby said recording-reproducing device, said instructor amplifier, said source and said student amplifier may be selectively coupled together.

6. In combination, a matrix-switching assembly comprising four circuit boards assembled in stacked relation, said boards having identical patterns of apertures therein, the apertures of the respective boards being in registry, said apertures each being provided with a switch contact; the apertures and contacts of the first and fourth boards being arranged in a plurality of straight parallel rows with the contacts of each row being connected together, the apertures and contacts of the second and third boards being arranged in a plurality of straight parallel columns with the contacts of each column being connected together, said rows and columns being orthogonally related; a plurality of recording-reproducing devices having input and output circuits respectively, said output circuits being connected to respective preselected rows on said first board, said input circuits being connected to respective preselected rows on said fourth board; an instruction amplifier having first and second input circuits and first and second output circuits, the first input circuit being connected to a preselected column on said third board, the first output circuit being connected to a different preselected row on said first board, said second input and output circuits being connected to a different preselected column on said second board and a different preselected row on said fourth board; said instruction amplifier including means for providing amplified signals in said first output circuit in response to signals applied to said first and second input circuits, means for providing amplified signals in said first output circuit in response to signals applied to said second input circuit, and means for providing amplified signals in said second output circuit in response to signals applied to said first input circuit; a plurality of sources of recorded signals connected respectively to a plurality of different preselected columns on said third board; and a plurality of student amplifiers having input and output circuits respectively, different other preselected columns of the third board being connected to said student amplifier input circuits respectively, different other preselected columns of the second board being connected to said student amplifier output circuits, respectively, means coupled to the output circuits of said student amplifiers for providing audible sounds in response to audio signals applied to the input circuits thereof; microphone means coupled to the input circuits of said student amplifiers, respectively; means coupled to the first output circuit of said instructor's amplifier for providing audible sounds in response to audio signals applied to one of the input circuits thereof; microphone means coupled to one of the input circuits of said instruction amplifier; and means for selectively interconnecting the respective contacts of said registered apertures whereby said recording-reproducing devices, said instruction amplifier, said sources, and said student amplifiers may be selectively coupled together.

7. The combination of claim 6 wherein said interconnecting means includes a plurality of selector pins individually movable in the registered apertures of said boards for interconnecting the rows and columns on the first and third boards respectively and on the fourth and second boards respectively, whereby said recording-reproducing devices, said instruction amplifier, said sources and said student amplifiers may be selectively coupled together.

8. In combination, at least two student audio amplifiers, each amplifier including first and second stages connected in cascade, each stage having an input and an output circuit, the output circuit of the first stage being connected to the input circuit of the second stage, volume control means included in each second stage whereby the level of audio volume delivered by each second stage may be controlled independently of the other second stage, two microphone devices connected to the input circuits of the aforesaid two first stages, respectively, means connected to the output circuits of the two aforesaid second stages for converting audio signals into audible sounds, a circuit conductively connecting together the output circuits of the aforesaid two first stages, switch means provided in said connecting circuit for controlling the exchange of signals between said two amplifiers, an electrical recording device having input and output circuits, said device including means for selectively recording and playing back information applied to the input circuit of said device; means for selectively coupling the output circuit of said device to the input circuits of said first stages whereby playback signal information may be fed to said student amplifiers; a signal circuit conductively connecting the output circuits of the aforesaid two first stages to the input circuit of said recording device, and switch means in said signal circuit for controlling the coupling of signals from the aforesaid first stages to said recording device.

9. In a communication system, two student amplifiers, each amplifier including first and second stages, each stage having input and output circuits, the output circuit of the first stage being coupled to the input circuit of the second stage, the impedance of the first stage output circuits and the second stage input circuits being substantially the same, two microphones connected to the input circuits of the two first stages, respectively, volume control means in the second stage of each amplifier for independently controlling the level of audio volume delivered by each second stage, two headsets connected to the two second stage output circuits, respectively, a signal circuit connecting together the output circuits of the two first stages, switch means in said signal circuit for controlling the exchange of audio signals between said amplifiers, a recording apparatus having a recording amplifier, said recording amplifier having input and output circuits, a signal-conducting circuit connecting the output circuits of said first two stages to the input circuit of said recording amplifier, said recording apparatus including means for recording audio signals coupled to the input circuit of said recording amplifier, said recording apparatus also including means for playing back the signals recorded as aforesaid, and switch means in said signal-conducting circuit for controlling the coupling of signals to said recording amplifier input circuit from the output circuits of the two aforesaid first stages, circuit means for coupling a signal from said playback means to the input circuits of said first stages, and means for selectively coupling said input circuits of said first stages together.

10. In a communications system, a student amplifier having first and second stages, said first stage having two input circuits, a microphone connected to one of said two input circuits, a switch connected to the other of said two input circuits, a master lesson reproducing device having an output circuit coupled to said switch, said switch controlling the coupling of said device to said other input circuit, said device including means for providing an audio signal in the output circuit thereof, said first stage having an output circuit connected to an input circuit for the second stage, earphones connected to an output circuit of said second stage, a recording mechanism for recording audio signals, said mechanism having an amplifier, a signal-conducting circuit coupling said recording amplifier to the output circuit of said first stage, switch means in said signal-conducting circuit for controlling the coupling of a signal over the latter from said first stage to said recording amplifier, play back means for reproducing the signals recorded by said recording mechanism, said play back means having an output circuit coupled to said other input circuit of said first stage, switch means for controlling the coupling of signals from said play back means output circuit to said first stage, an instructor's amplifier having input and output circuits, a second signal-conducting circuit connecting said first stage output circuit to said instructor's amplifier input circuit, switch means for controlling the conduction of signals by said second signal-conduction circuit, and means coupled to said instructor's amplifier output circuit for transforming electrical signals into audible sound.

11. The system of claim 10 and including means for controlling the operation of said master lesson reproducing device, said recording mechanism and said playback amplifier operating independently of each other, whereby the signal information of said master lesson reproducing device and student responses may be recorded by said recording mechanism and then played back selectively to said instructor's amplifier or student amplifier or both.

12. The system of claim 10 and including means for controlling the operation of said master lesson reproducing device, said recording mechanism and said playback amplifier operating independently of each other, whereby the signal information of said master lesson reproducing device and student responses may be recorded by said recording mechanism and then played back selectively to said instructor's amplifier or student amplifier or both, and volume control means in the second stage of said student amplifier whereby the volume of the signal reproduced in said earphones may be controlled independently of any signal passing from said student amplifier to said recording mechanism or to said instructor's amplifier.

13. In a communications system, a source of recorded electrical signals, said source having an output circuit of predetermined impedance to which said signals are supplied, a first student amplifier having input and output circuits, microphone means connected to said input circuit, a first signal circuit coupling the output circuit of said source to said input circuit, means coupled to the output circuit of said amplifier for converting audio signals into audible sounds, said signal circuit having a switch therein for controlling the coupling of said signals from said source to said amplifier, a second amplifier having an input and an output circuit, the impedance of said second amplifier output circuit being less than the impedance of said source output circuit, means generating an audio signal for coupling to the input circuit of said second amplifier, means for coupling said second amplifier output circuit to said student amplifier input circuit whereby signals may be conducted to the latter in shunt with the signals from said source, the signals of said source being attenuated by reason of the lower impedance of said second amplifier output circuit, means for selectively coupling the output circuit of said student amplifier to the input circuit of said second amplifier, and means coupled to the output circuit of said second amplifier for converting audio signals into audible sound.

14. The system of claim 10 including a microphone coupled to the input circuit of said instructor's amplifier, a third signal-conducting circuit connecting the input circuit of said instructor's amplifier to the other input circuit of said first stage and switch means for controlling the conduction of signals by said third signal-conducting circuit.

15. The system of claim 10 including a microphone coupled to the input circuit of said instructor's amplifier, a third signal-conducting circuit connecting the input circuit of said instructor's amplifier to the other input circuit of said first stage, switch means for controlling the conduction of signals by said third signal-conducting circuit, a fourth signal-conducting circuit connecting the output circuit of said instructor's amplifier to the other input circuit of said first stage, and switch means for controlling the conduction of signals by said fourth signal-conducting circuit.

16. The system of claim 10 including a microphone coupled to the input circuit of said instructor's amplifier, a third signal-conducting circuit connecting the input circuit of said instructor's amplifier to the other input circuit of said first stage, switch means for controlling the conduction of signals by said third signal-conducting circuit, a fourth signal-conducting circuit connecting the output circuit of said instructor's amplifier to the other input circuit of said first stage, switch means for controlling the conduction of signals by said fourth signal-conducting circuit, a fifth signal-conducting circuit connecting the output circuit of said instructor's amplifier to the input circuit of said second stage, and switch means for controlling the conduction of signals by said fifth signal-conducting circuit.

17. In a communications system, a student amplifier having first and second stages, said first stage having two input circuits, a first microphone connected to one of said input circuits, a master lesson-reproducing device having an output circuit, first switch means for selectively connecting the output circuit of said device to the other input circuit of said first stage, said device including means for providing an audio signal in the output circuit thereof, said first stage having an output circuit coupled to an input circuit for said second stage, first earphones connected to an output circuit of said second stage; an instructor's amplifier having first and second stages, said first instructor's amplifier stage having an input circuit, a second microphone connected to the input circuit of the last-mentioned first stage, said last-mentioned first stage having an output circuit coupled to an input circuit of the last-mentioned second stage, second switch means for selectively connecting the output circuit of the last-mentioned first stage and the input circuit of the last-mentioned second stage to the output and input circuits, respectively, of the student amplifier first and second stages, second earphones connected to an output circuit of the second stage of said instructor's amplifier; and third switch means for selectively connecting the output circuit of the second stage of said instructor's amplifier to said other input circuit of the first stage of said student amplifier whereby signals from said device as well as from said instructor's amplifier may be fed conjointly to the first stage of said student amplifier.

18. In a communications system, a student amplifier having first and second stages, said first stage having two input circuits, a first microphone connected to one of said input circuits, a master lesson-reproducing device having an output circuit, first switch means for selectively connecting the output circuit of said device to the other input circuit of said first stage, said device including means for providing an audio signal in the output circuit thereof, said first stage having an output circuit coupled to an input circuit for said second stage, first earphones connected to an output circuit of said second stage; an instructor's amplifier having first and second stages, said first instructor's amplifier stage having an input circuit, a second microphone connected to the input circuit of the last-mentioned first stage, said last-mentioned first stage having an output circuit coupled to an input circuit of the last-mentioned second stage, second switch means for selectively connecting the output circuit of the last-mentioned first stage and the input circuit of the last-mentioned second stage to the output and input circuits, respectively, of the student amplifier first and second stages, second earphones connected to an output circuit of the second stage of said instructor's amplifier; third switch means for selectively connecting the output circuit of the second stage of said instructor's amplifier to said other input circuit of the first stage of said student amplifier whereby signals from said device as well as from said instructor's amplifier may be fed conjointly to the first stage of said student amplifier, and fourth switch means for selectively connecting said second microphone to said other input circuit of the first stage of said student amplifier.

19. In a communications system, a student amplifier having first and second stages, said first stage having two input circuits, a first microphone connected to one of said input circuits, a master lesson-reproducing device having an output circuit, first switch means for selectively connecting the output circuit of said device to the other input circuit of said first stage, said device including means for providing an audio signal in the output circuit thereof, said first stage having an output circuit coupled to an input circuit for said second stage, first earphones connected to an output circuit of said second stage; an instructor's amplifier having first and second stages, said first instructor's amplifier stage having an input circuit, a second microphone connected to the input circuit of the last-mentioned first stage, said last-mentioned first stage having an output circuit coupled to an input circuit of the last-mentioned second stage, second switch means for selectively connecting the output circuit of the last-mentioned first stage and the input circuit of the last-mentioned second stage to the output and input circuits, respectively, of the student amplifier first and second stages, second earphones connected to an output circuit of the second stage of said instructor's amplifier; third switch means for selectively connecting the output circuit of the second stage of said instructor's amplifier to said other input circuit of the first stage of said student amplifier whereby signals from said device as well as from said instructor's amplifier may be fed conjointly to the first stage of said student amplifier, fourth switch means for selectively connecting said second microphone to said other input circuit of the first stage of said student amplifier, a recording mechanism for recording audio signals, said mechanism having an amplifier, fifth switch means for selectively connecting said recording amplifier to the output circuit of the first stage of said student amplifier, playback means for reproducing the signals recorded by said recording mechanism, said playback means having an output circuit, sixth switch means for selectively connecting the last-mentioned output circuit to said other input stage of said student amplifier.

20. The system of claim 19 wherein said first, second, third, fourth, fifth and sixth switch means include four contact-supporting members assembled in fixed relation, said members each having predetermined patterns of electrical contacts, the contact patterns of said members being in operative registry with each other, said first switch means including preselected contacts on the first and third of said four members, said second switch means including preselected contacts on the second and fourth of said four members, said third switch means including other preselected contacts on said first and third members, said fourth switch means including still other preselected contacts on said first and third members, and said fifth switch means including other preselected contacts on said second and fourth members.

21. The system of claim 17 wherein the second stage of said student amplifier includes means for controlling the amplitude of a signal coupled to said first earphones, and the second stage of said instructor's amplifier includes means for controlling the amplitude of a signal coupled to said second earphones.

References Cited in the file of this patent

UNITED STATES PATENTS

| | | |
|---|---|---|
| 1,640,755 | Deale | Aug. 30, 1927 |
| 2,209,157 | Glunt | July 23, 1940 |
| 2,777,401 | Dostert | Jan. 15, 1957 |
| 2,876,561 | Horne | Mar. 10, 1959 |
| 2,885,495 | Sziklai et al. | May 5, 1959 |
| 2,910,785 | Schwartz | Nov. 3, 1959 |
| 2,911,482 | Dostert | Nov. 3, 1959 |
| 2,927,275 | Hermann et al. | Mar. 1, 1960 |
| 2,935,793 | Herman | May 10, 1960 |
| 2,964,986 | Johnson | Dec. 20, 1960 |
| 3,045,065 | Metzner et al. | July 17, 1962 |

OTHER REFERENCES

Sunday Star, Star Magazine Section (Teaching by Tape), page 68, Aug. 23, 1959.

Audio Teaching Center, "Guided Laboratory Program," Catalog 960, ATC, New Haven, Conn, February 1960.

Rheem Califone Language Laboratory, Rheem Califone Co., Hollywood 38, California, March 1960.

RCA Preceptor Language Laboratory (RCA Form 3R3866 Rev.), April 1960.

"Tape Recording," vol. 7 (pp. 23–27), Tape of Babel, Oct. 11, 1960.

UNITED STATES PATENT OFFICE
CERTIFICATE OF CORRECTION

Patent No. 3,147,555 September 8, 1964

William R. Dufendach et al.

It is hereby certified that error appears in the above numbered patent requiring correction and that the said Letters Patent should read as corrected below.

Column 9, line 3, for "coupling" read -- decoupling --; column 12, line 13, for "164" read -- 154 --; column 16, lines 65 and 74, for "amplifier", each occurrence, read -- means --.

Signed and sealed this 12th day of January 1965.

(SEAL)
Attest:

ERNEST W. SWIDER
Attesting Officer

EDWARD J. BRENNER
Commissioner of Patents